(12) United States Patent
Aida

(10) Patent No.: US 10,197,148 B2
(45) Date of Patent: Feb. 5, 2019

(54) ACTUATOR AND METHOD OF MANUFACTURING THE SAME

(71) Applicant: Mitsuba Corporation, Gunma (JP)

(72) Inventor: Satoshi Aida, Gunma (JP)

(73) Assignees: Mitsuba Corporation, Kiryu-shi, Gunma (JP); Akebono Brake Industry Co., Ltd., Tokyo (JP)

( * ) Notice: Subject to any disclaimer, the term of this patent is extended or adjusted under 35 U.S.C. 154(b) by 41 days.

(21) Appl. No.: 15/550,166

(22) PCT Filed: Feb. 5, 2016

(86) PCT No.: PCT/JP2016/053444
§ 371 (c)(1),
(2) Date: Aug. 10, 2017

(87) PCT Pub. No.: WO2016/129511
PCT Pub. Date: Aug. 18, 2016

(65) Prior Publication Data
US 2018/0023681 A1    Jan. 25, 2018

(30) Foreign Application Priority Data
Feb. 12, 2015 (JP) ................................ 2015-025285

(51) Int. Cl.
*F16H 57/021* (2012.01)
*F16H 57/03* (2012.01)
(Continued)

(52) U.S. Cl.
CPC ....... *F16H 57/021* (2013.01); *B29C 45/0046* (2013.01); *B60T 13/746* (2013.01);
(Continued)

(58) Field of Classification Search
CPC ........ F16H 57/021; F16H 57/03; F16D 65/14; F16D 65/16; B29C 45/0046; B29C 45/006; H02K 7/10; H02K 7/116; H02K 15/14
See application file for complete search history.

(56) References Cited

U.S. PATENT DOCUMENTS 9,145,950 B2 *  9/2015  Dettenberger .......... F16D 65/28
9,500,240 B2 * 11/2016  Fuse ..................... F16D 55/226
(Continued)

FOREIGN PATENT DOCUMENTS

| JP | 2000-74111 A | 3/2000 |
|---|---|---|
| JP | 2007-49866 A | 2/2007 |
| JP | 2014-29193 A | 2/2014 |

OTHER PUBLICATIONS

International Search Report for PCT Serial No. PCT/JP2016/053444 dated Apr. 8, 2016.

*Primary Examiner* — Melanie Torres Williams
(74) *Attorney, Agent, or Firm* — McCormick, Paulding & Huber LLP

(57) ABSTRACT

Since a second reinforcing rib (24e) protruding from a motor accommodating portion (24) to outside is provided to a portion formed with a weld line (WL) formed by the merger of molten resin (MR), the material thickness of the portion formed with the weld line (WL) can be increased. Therefore, the strength of the portion formed with the weld line (WL) is improved, and the strength of a case (21) as a whole can be improved. The case (21) sufficiently resistible to outer shocks can be achieved, and can be sufficiently used even in adverse environments such as a place near an undercarriage of a vehicle, and high reliability can be obtained. Since a small flange portion is provided on a caliper fixing portion side which supports an output shaft where large running torque is loaded, the weld line can be kept away from the caliper fixing portion, with this small flange portion taken as an inlet portion for the molten resin. Thus, with the caliper fixing portion side of the case inhibited from being distorted, it is possible to reliably inhibit unusual noise and so forth from occurring from an actuator.

13 Claims, 16 Drawing Sheets

(51) Int. Cl.

|  |  |
|---|---|
| *H02K 5/08* | (2006.01) |
| *H02K 7/116* | (2006.01) |
| *B29C 45/00* | (2006.01) |
| *B60T 13/74* | (2006.01) |
| *H02K 15/14* | (2006.01) |
| *B29K 67/00* | (2006.01) |
| *B60T 1/06* | (2006.01) |
| *F16H 57/02* | (2012.01) |

(52) U.S. Cl.
CPC ............... *F16H 57/03* (2013.01); *H02K 5/08* (2013.01); *H02K 7/116* (2013.01); *H02K 15/14* (2013.01); *B29C 2045/0049* (2013.01); *B29K 2067/006* (2013.01); *B60T 1/065* (2013.01); *F16H 2057/02034* (2013.01)

(56) References Cited

U.S. PATENT DOCUMENTS

2012/0325601 A1* 12/2012 Giering ............... F16D 65/0006
  188/162
2013/0180811 A1* 7/2013 Poertzgen ............. B60T 13/741
  188/156
2014/0034430 A1  2/2014 Fuse et al.

\* cited by examiner

ACTUATOR AND METHOD OF MANUFACTURING THE SAME

CROSS-REFERENCE TO RELATED APPLICATIONS

This application is a National Stage application of International Patent Application No. PCT/JP2016/053444, filed on Feb. 5, 2016, which claims priority to Japanese Patent Application No. 2015-025285, filed on Feb. 12, 2015, each of which is hereby incorporated by reference in its entirety.

TECHNICAL FIELD

The present invention relates to an actuator which includes: a motor having a rotation shaft; an output shaft for outputting rotation of the rotation shaft; a speed reduction mechanism provided between the rotation shaft and the output shaft, and a case in which the motor, the output shaft, and the speed reduction mechanism are accommodated, and relates to a method of manufacturing the actuator.

BACKGROUND ART

Conventionally, an in-vehicle actuator mounted on a vehicle such as an automotive vehicle is used as, for example, a driving source for power window apparatus or sliding door opening/closing apparatus. Since this actuator is installed in a narrow space such as the inside of a door, the actuator includes a speed reduction mechanism configured to obtain large outputs and reduced in size and. In this case, as being installed inside a door, a passenger compartment, or the like, the actuator described above tends to be hardly exposed to external environments such as rain water, dust, and ultraviolet rays, and therefore an case made of aluminium is often adopted, with high priority given to light weight and so forth.

Meanwhile, a vehicle-mounted actuator may be used as a driving source of an electrically-operated brake apparatus, for example, as disclosed in Japanese Unexamined Patent Application Publication No. 2014-029193. The brake apparatus described in this Patent Document 1 includes an actuator for moving a piston provided in a cylinder of a caliper. The actuator described in the Japanese Unexamined Patent Application Publication No. 2014-029193 is provided near an undercarriage of a vehicle, installed in adverse environments and as a matter of course, the actuator is exposed to rain water, dust, and so forth and there are concerns such as a hit by a stone. Therefore, the case forming part of the actuator is formed of high-strength resin material so as to be able to obtain sufficient strength while having weather resistance.

SUMMARY

As described above, the actuator installed and used in adverse environments needs strength sufficiently resistible to shocks caused by a stone or the like. However, when the case of the actuator is formed by using injection molding, depending on a position of a gate of a metal mold, a weld line may be formed at a predetermined location of the case in a metal mold. In this case, a portion having a weld line caused in a manufacturing process generally tends to be weak in strength, compared with other portions of this case. Thus, if some contrivance is made for this portion having a weld line, a case with higher strength and reliability can be achieved.

An object of the present invention is to provide an actuator sufficiently usable even in adverse environments by reinforcing a portion having a weld line occurring in an injection molding process to improve strength of a case of the actuator as a whole, and to provide a method of manufacturing the actuator.

According to one aspect of the present invention, there is provided an actuator comprising: a motor having a rotation shaft; an output shaft which outputs rotation of the rotation shaft; a speed reduction mechanism provided between the rotation shaft and the output shaft; and a case in which the motor and the speed reduction mechanism are accommodated, the case having: an accommodating portion in which the motor is accommodated; a support portion provided and arranged side by side with the accommodating portion in a direction crossing an axial direction of the accommodating portion, the support portion supporting the output shaft; a convex portion provided to the support portion and located on the opposite side of the support portion from the accommodating portion, the convex portion protruding in a direction crossing the output shaft, the convex portion being formed by an inlet portion for molten material in upper and lower molds; a weld line provided to the accommodating portion and located on the opposite side of the support portion from the support portion, the weld line being formed by the merger of molten material, and a reinforcing rib provided to a portion in which the weld line is formed, the reinforcing rib protruding from the accommodating portion to outside.

In another aspect of the present invention, the accommodating portion is in a cylindrical shape having a closed end and an open end, and the reinforcing rib extends from one end side to the other end side of the accommodating portion.

In another aspect of the present invention, the rotation shaft is rotatably supported by a bearing member, a bearing accommodating portion in which the bearing member is accommodated is provided on one end side of the accommodating portion, and the reinforcing rib extends to the bearing accommodating portion.

In another aspect of the present invention, the reinforcing rib protrudes from the accommodating portion, a height of the reinforcing rib from the accommodating portion being gradually increased from one end side toward the other end side of the accommodating portion.

In another aspect of the present invention, a connector connecting portion to which an external connector is connected is provided to the reinforcing rib and located on the opposite side of the reinforcing rib from the accommodating portion, and a material thickness of the case between the accommodating portion and the support portion is thicker than a material thickness of the case between the accommodating portion and the connector connecting portion.

In another aspect of the present invention, an inner groove portion is provided to the accommodating portion and located on the same side as the connector connecting portion, the inner groove portion extending in the axial direction of the accommodating portion, and making the material thickness of the case thinner.

In another aspect of the present invention, the inner groove portion is a plurality of inner groove portions provided in a circumferential direction of the accommodating portion, and among the inner groove portions, an inner groove portion located on the same side as the support portion is distant from a bottom wall portion of the accommodating portion as compared with other inner groove portions.

In another aspect of the present invention, an outer groove portion extending in the axial direction of the accommodating portion and making the material thickness of the case thinner is formed outside the accommodating portion in a radial direction and on the same side as the connector connecting portion along the circumferential direction of the accommodating portion.

In another aspect of the present invention, the outer groove portion extends to a bottom wall portion of a cylindrical main body portion forming part of the accommodating portion.

In another aspect of the present invention, a reinforcing rib extending toward a center axis of the accommodating portion is provided between the accommodating portion and the support portion.

In another aspect of the present invention, the output shaft causes a piston of a disc brake to perform reciprocating motions.

In still another aspect of the present invention, there is provided a method of manufacturing an actuator including: a motor having a rotation shaft; an output shaft which outputs rotation of the rotation shaft; a speed reduction mechanism provided between the rotation shaft and the output shaft; and a case in which the motor and the speed reduction mechanism are accommodated, the case having: an accommodating portion in which the motor is accommodated; a support portion provided and arranged side by side with the accommodating portion in a direction crossing an axial direction of the accommodating portion, the support portion supporting the output shaft, a convex portion provided to the support portion and located on the opposite side of the support portion from the accommodating portion, the convex portion protruding in a direction crossing the output shaft; a weld line provided to the accommodating portion and located on the opposite side of the support portion from the support portion, the weld line being formed by the merger of molten material; and a reinforcing rib provided to a portion in which the weld line is formed, the reinforcing rib protruding from the accommodating portion to outside, the method comprising: a mold preparing step of causing upper and lower molds forming the case to face each other so as to form a cavity for forming the case; a filling step of actuating a dispenser to supply molten material to a supply passage provided to at least one of the upper and lower mold, and filling the cavity with molten material to form the convex portion on the same side as the supply passage of the cavity, and to form the weld line on the opposite side of the cavity from the supply passage; a cooling step of stopping the dispenser and cooling the upper and lower molds to cure the molten material in the cavity; and a removing step of separating the upper and lower molds from each other to remove the case from the upper and lower molds after curing from the upper and lower molds.

In yet another aspect of the present invention, in the filling step, the molten material is caused to collide with a step portion provided to at least one of the upper and lower molds from the supply passage to bend a traveling direction of the molten material, and then the cavity is filled with the molten material.

According to the present invention, since the reinforcing rib protruding from the accommodating portion to outside is provided to a portion having a weld line formed by the merger of molten material, the portion having a weld line can be increased in material thickness. Therefore, the portion having a weld line is improved in strength, and as a whole, the case can be improved in strength. Since the case sufficiently resistible to outer shocks can be achieved, the case can be sufficiently used in an undercarriage of a vehicle even in adverse environments, and high reliability can be obtained.

Furthermore, since the convex portion is provided to the support portion for supporting the output shaft on which large running torque is loaded, and the convex portion is used as an inlet portion for molten material, a portion having a weld line can be kept away from the support portion. Therefore, the support portion of the case is prevented from being distorted, and it is possible to reliably suppress unusual noise and so forth from occurring from the actuator.

DETAILED DESCRIPTION

Hereinafter, the first embodiment of the present invention will be described in detail by using the drawings.

Figure 1:
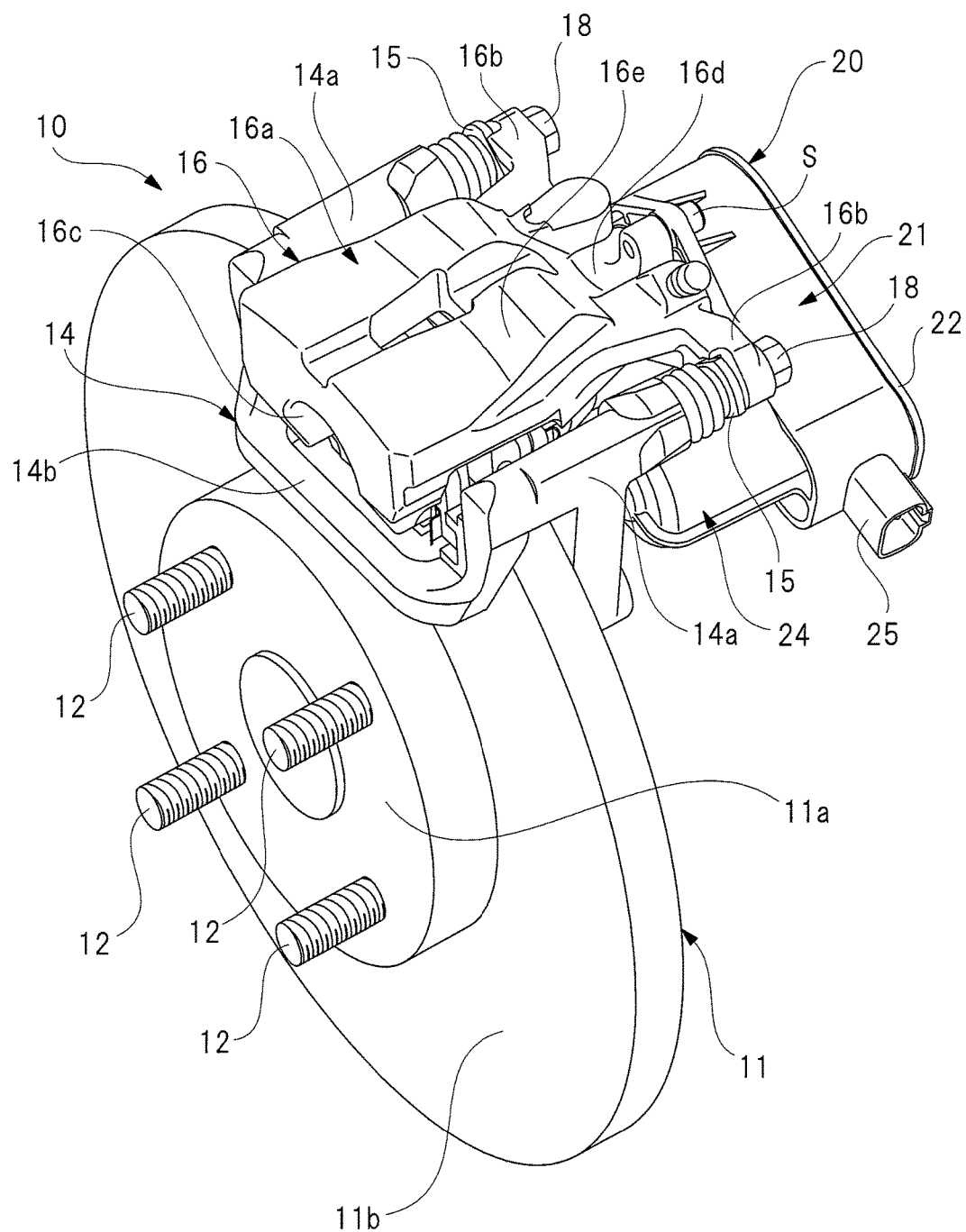
FIG. 1 is a perspective view of a general outline of a brake apparatus.
Figure 2:
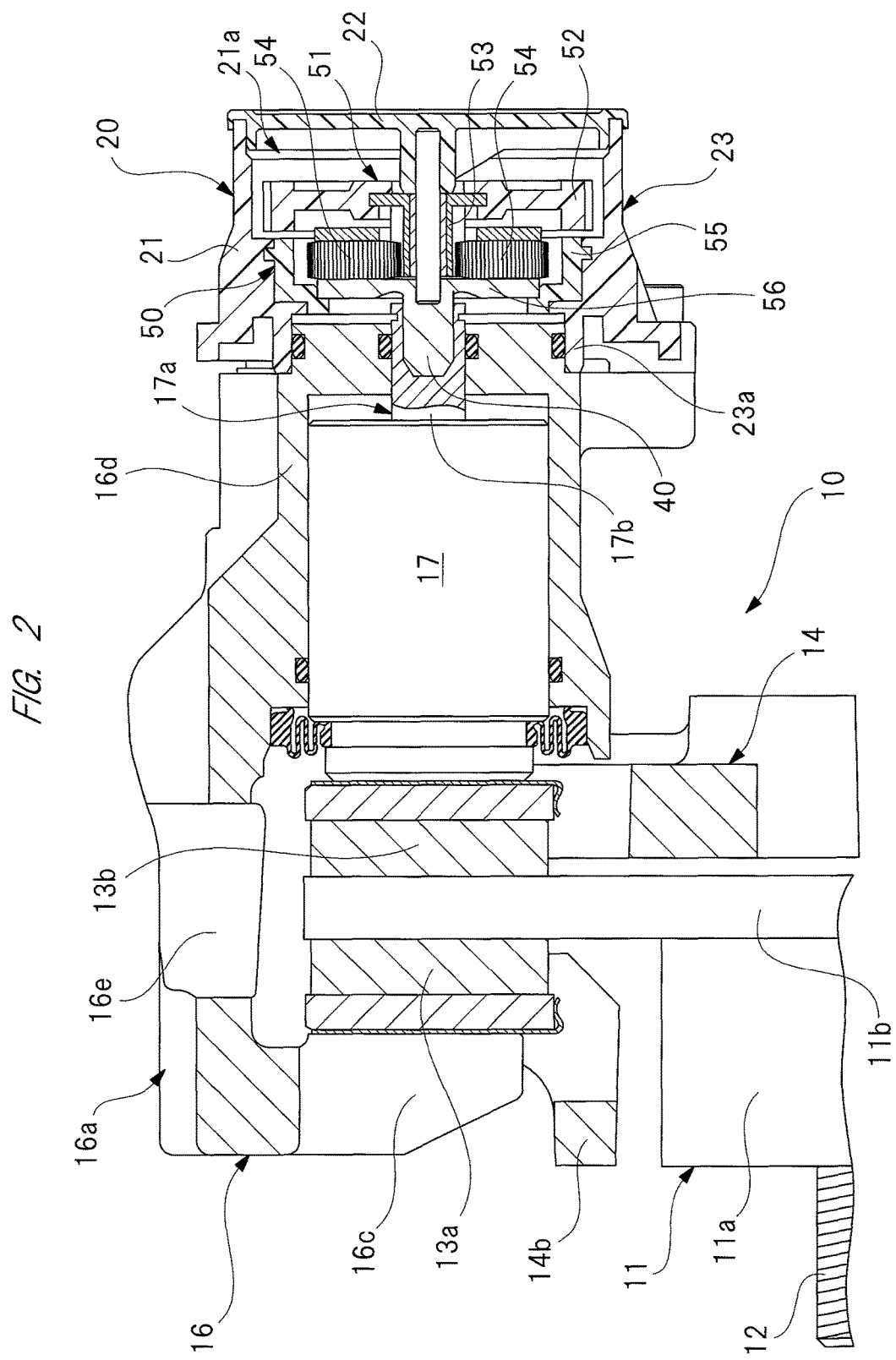
FIG. 2 is a sectional view describing an internal structure of the brake apparatus.
Figure 3:
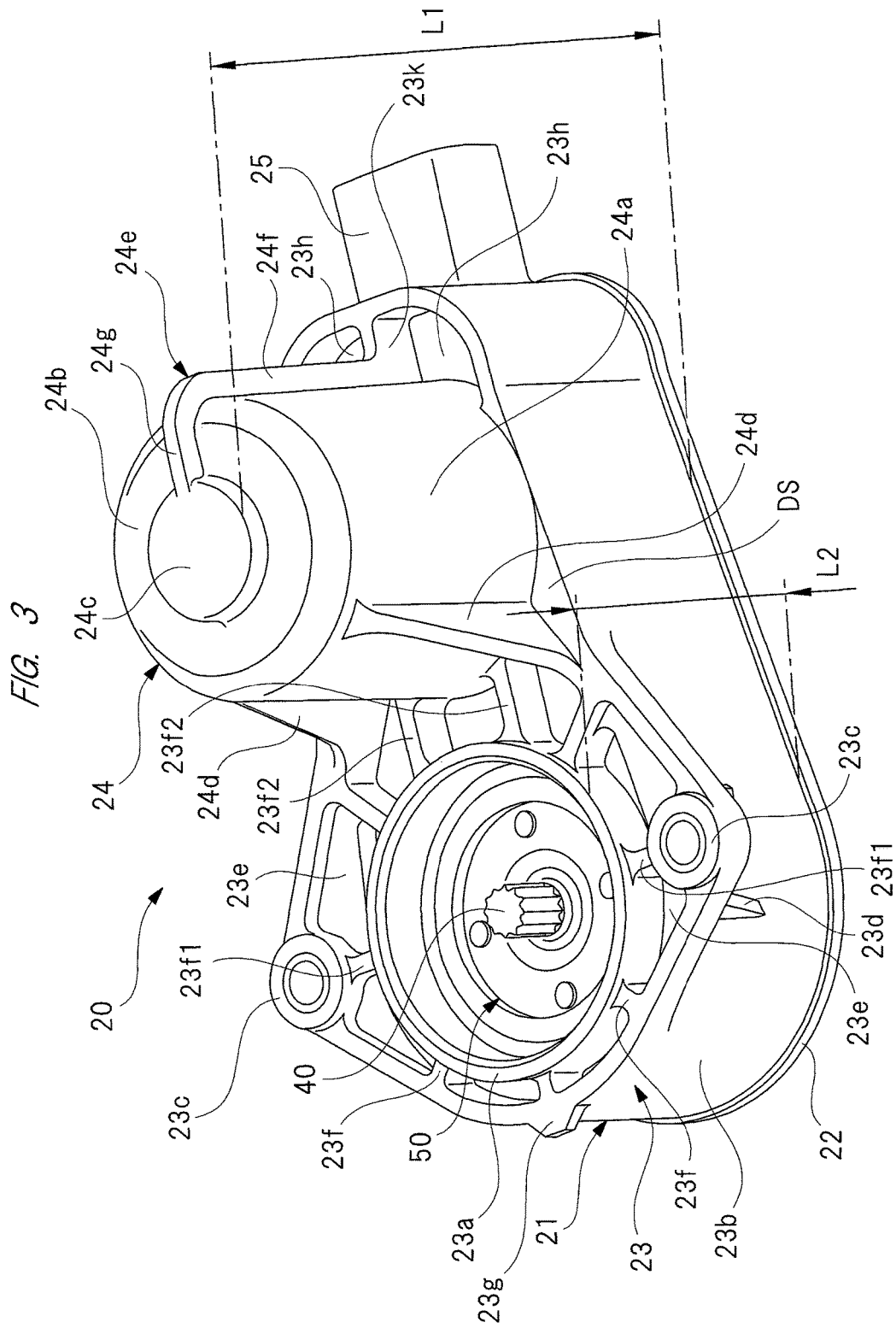
FIG. 3 is a perspective view of a case side of an actuator of a first embodiment.
Figure 4:
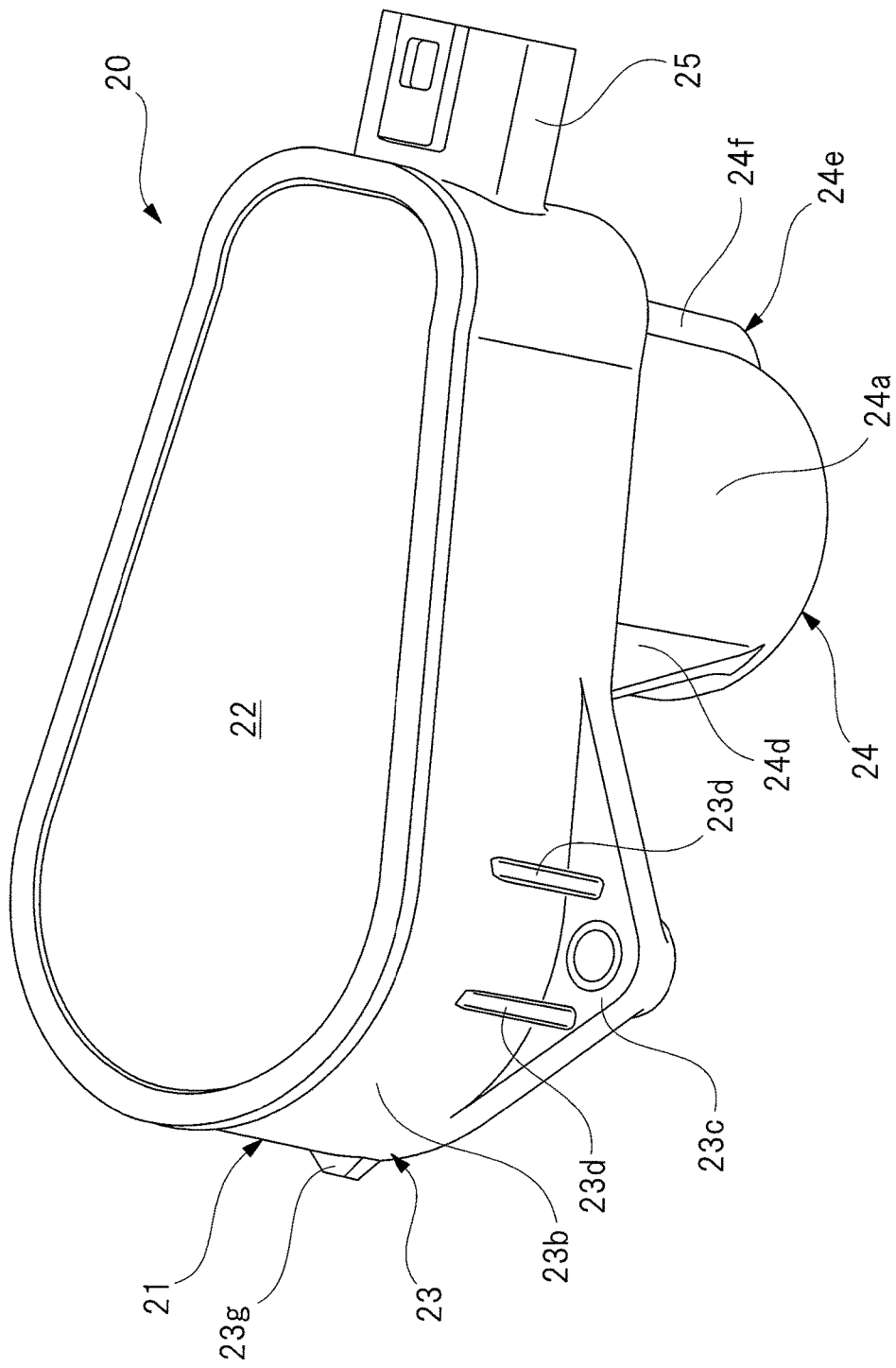
FIG. 4 is a perspective view of a cover side of the actuator of FIG. 3.
Figure 5:
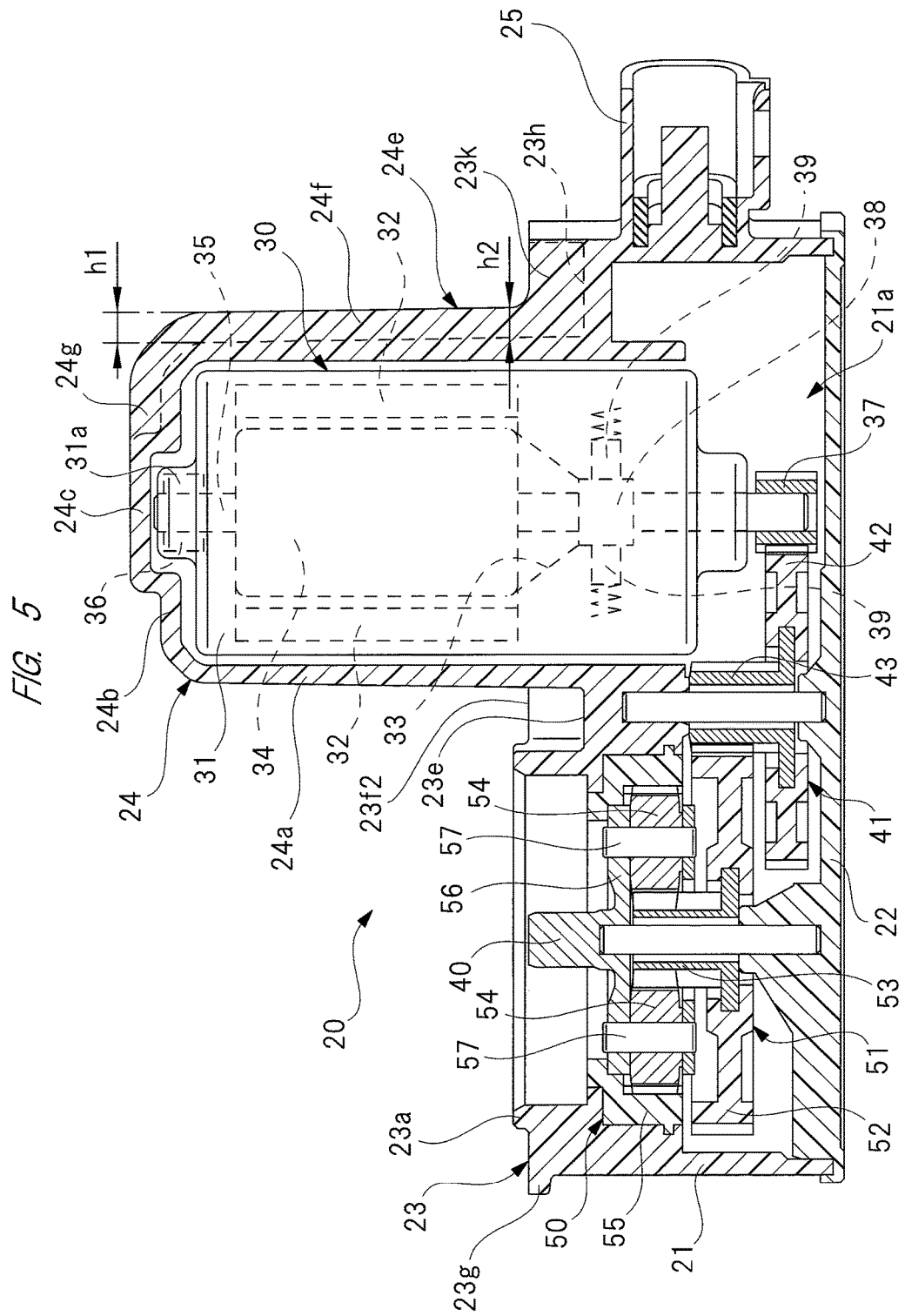
FIG. 5 is a sectional view describing an internal structure of the actuator of FIG. 3.
Figure 6:
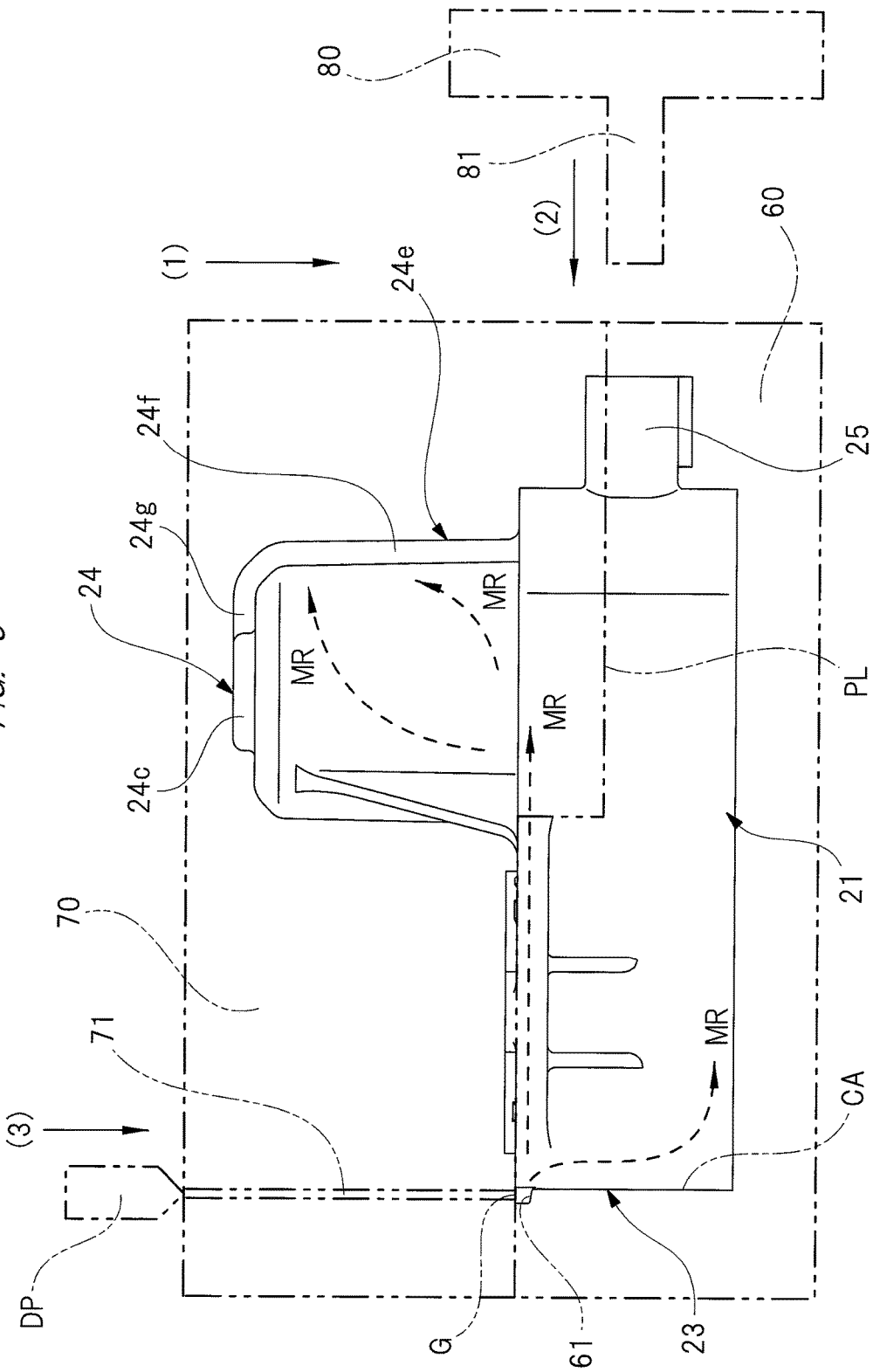
FIG. 6 is a side view describing a manufacturing procedure of the case of FIG. 3.
Figure 7:
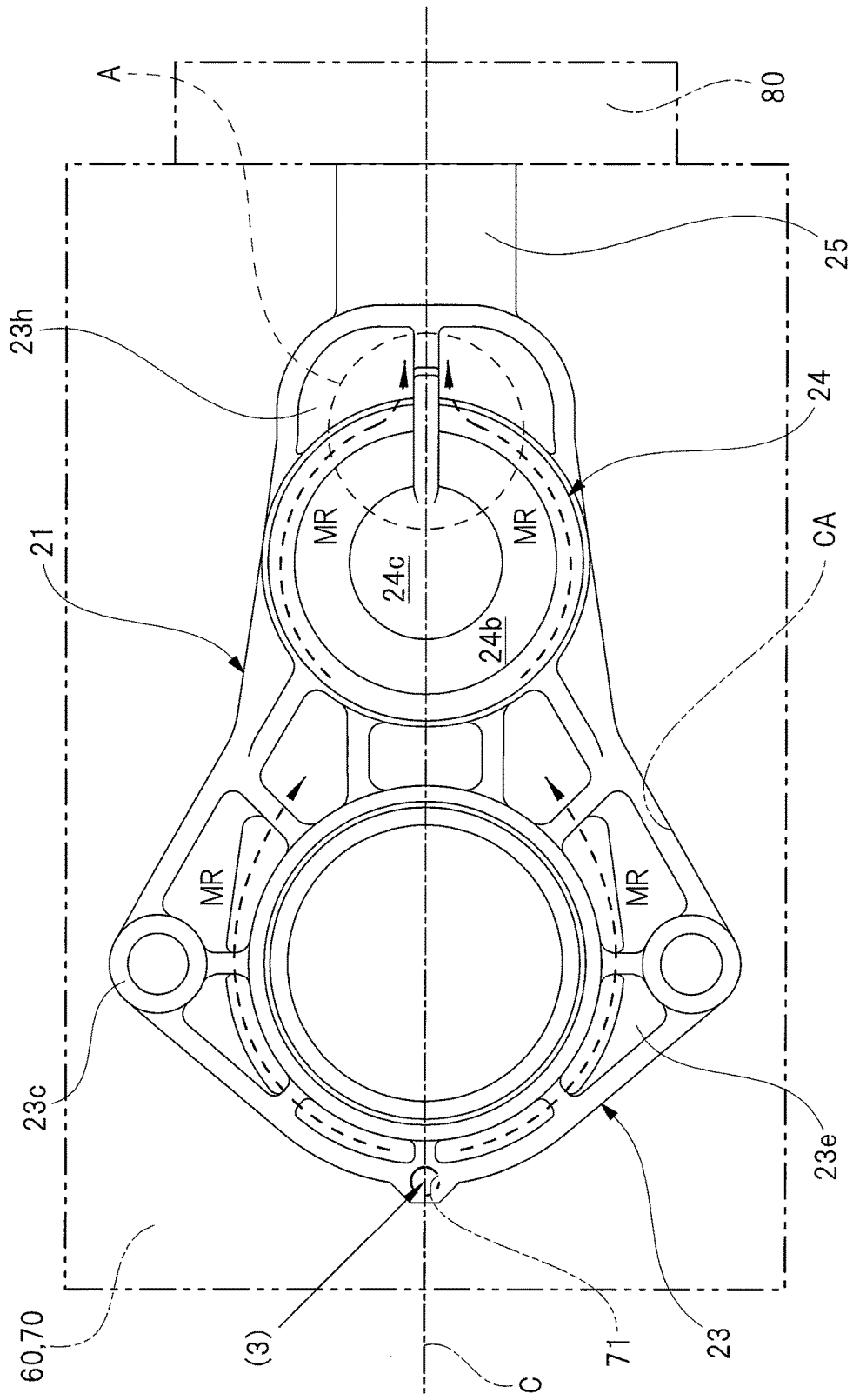
FIG. 7 is a plan view describing the manufacturing procedure of the case of FIG. 3.
Figure 8:
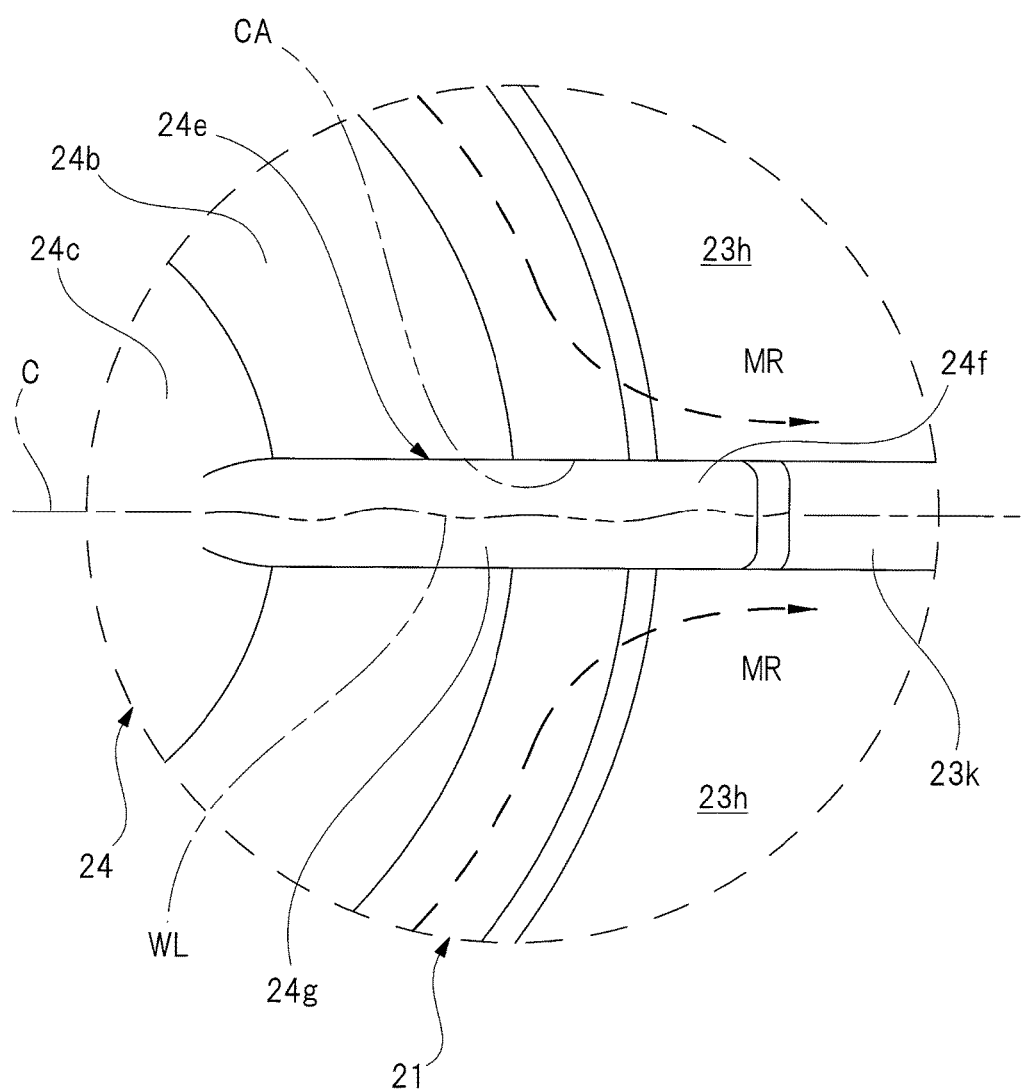
FIG. 8 is an enlarge view of a portion of a broken circle "A" of FIG. 7.

FIG. 1 is a perspective view of a general outline of a brake apparatus, FIG. 2 is a sectional view describing an internal structure of the brake apparatus, FIG. 3 is a perspective view of a case side of the actuator of the first embodiment, FIG. 4 is a perspective view of a cover side of the actuator of FIG. 3, FIG. 5 is a sectional view describing an internal structure of the actuator of FIG. 3, FIG. 6 is a side view describing a manufacturing procedure of the case of FIG. 3, FIG. 7 is a plan view describing the manufacturing procedure of the case of FIG. 3, and FIG. 8 is an enlarge view of a portion of a broken circle "A" of FIG. 7.

As shown in FIGS. 1 and 2, a brake apparatus (disk brake) 10 includes an electric parking brake apparatus, and includes a rotor 11 integrally and rotatably attached to an axel (not shown) of a vehicle. The rotor 11 includes: a rotor main body 11a having a plurality of (four in the drawing) hub bolts 12; and a disc portion 11b integrally provided outside the rotor main body 11a in a radial direction. The disc portion 11b forms a friction surface sandwiched by paired pads 13a and 13b. Also, a wheel (not shown) is attached to the rotor main body 11a, and a wheel nut (not shown) is screwed onto each of the hub bolts 12.

The brake apparatus 10 includes a mounting bracket 14 to be fixed to a non-rotating portion (not shown) such as a knuckle of the vehicle. The mounting bracket 14 is formed into a predetermined shape by casting, and paired pin attachment portions 14a to which paired slide pin bolts 15 are slidably attached are integrally provided. Each pin attachment portion 14a extends in an axial direction of the rotor 11, and each slide pin bolt 15 is movable in the axial direction of the rotor 11. Between the pin attachment portions 14a, a bridging portion 14b is integrally provided. The pin attachment portions 14a are arranged with a predetermined space in a circumferential direction of the rotor 11.

The brake apparatus 10 includes the caliper 16 movably attached to the mounting bracket 14. The caliper 16 is formed into a predetermined shape by casing, similarly to the mounting bracket 14, and includes a caliper main body 16a and paired pin fixing portions 16b. The caliper main body 16a has a substantially U-shaped section extending across the disc portion 11b of the rotor 11, and includes a claw portion 16c, a cylinder portion 16d, and a coupling portion 16e. The coupling portion 16e couples the claw portion 16c and the cylinder portion 16d together.

The claw portion 16c is arranged on the same side as a hub bolt 12 along the axial direction of the rotor 11. The cylinder portion 16d is arranged on the opposite side from the hub bolt 12 along the axial direction of the rotor 11. Here, on the opposite side from the hub bolt 12 along the axial direction of the rotor 11, a shock absorber (not shown) which attenuates vibrations of the vehicle is arranged. Thus, the brake apparatus 10 is fixed to the vehicle so as to avoid the shock absorber.

As shown in FIG. 2, the cylinder portion 16d is formed into a bottom-closed cylindrical shape. Inside the cylinder portion 16d, a piston 17 is slidably provided. That is, the piston 17 is movably held by the caliper 16, and slides in the axial direction of the rotor 11. Here, the inside of the cylinder portion 16d in the radial direction is cut so that the piston 17 can smoothly slide.

Furthermore, inside the cylinder portion 16d and on a back surface side (right side in the drawing) of the piston 17, brake fluid (not shown) is supplied by operation of a brake pedal (not shown). That is, at the time of normal braking by brake pedal operation of a driver, a braking force is generated by supply of the brake fluid.

As shown in FIG. 1, the paired pin fixing portions 16b are provided so as to protrude in directions opposite to each other so as to oppose each other outside the cylinder portion 16d in the radial direction. Into a tip portion of each pin fixing portion 16b, a bolt 18 is inserted. The bolt 18 is fixed to the slide pin bolt 15. With this, the caliper 16 is movable in the axial direction of the rotor 11 with respect to the mounting bracket 14.

As shown in FIG. 2, the claw portion 16c presses one pad (outer pad) 13a disposed on the same side as the hub bolt 12 in the disc portion 11b toward the disc portion 11b. Also, the piston 17 presses the other pad (inner pad) 13b disposed on the opposite side from the hub bolts 12 in the disc portion 11b toward the disc portion 11b.

More specifically, when the brake pedal operation by the driver supplies brake liquid to the back surface side of the piston 17, the piston 17 is pushed from inside the cylinder portion 16d to the outside to move to left in FIG. 2. Thus, the piston 17 presses the pad 13b toward the disc portion 11b. On the other hand, when the piston 17 presses the pad 13b, a counterforce causes the caliper 16 to move to right in FIG. 2 with respect to the mounting bracket 14. Thus, the claw portion 16c presses the pad 13a toward the disc portion 11b.

The piston 17 has a hollow structure, and a feed screw mechanism 17a (not shown in detail) is accommodated in this piston. The feed screw mechanism 17a includes a male screw member 17b to be forwardly and reversely rotated by the actuator 20. Also, the feed screw mechanism 17a includes a female screw member (not shown) where the male screw member 17b is screwed. Thus, when a parking brake switch (not shown) inside the vehicle is operated by the driver, the male screw member 17b is driven by the actuator 20 to rotate in a forward or reverse direction. That is, the output shaft 40 (see FIG. 2) of the actuator 20 causes the piston 17 of the brake apparatus 10 to perform reciprocating motions.

As shown in FIGS. 1 and 2, the brake apparatus 10 includes the actuator (brake actuator) 20 which drives the feed screw mechanism 17a. The actuator 20 is fixed to a bottom side opposite to a rotor 11 in the cylinder portion 16d. In the following, the structure of the actuator 20 which is operated at the time of operation of the parking brake switch will be described in detail by using the drawings.

As shown in FIGS. 3 to 5, the actuator 20 includes a case 21 formed in a substantially L-shape. This case 21 has an opening 21a (see FIGS. 2 and 5) hermetically sealed with a cover 22, thereby preventing rain water, dust, and so forth from entering the inside of the case 21. The case 21 and the cover 22 are each formed in a predetermined shape by injection molding of resin material.

Here, the case 21 occupies most of an outer hull of the actuator 20, and it is exposed to adverse environments near or around an undercarriage of the vehicle. Therefore, the case 21 is formed of polybutylene terephthalate resin (PBT resin), which is excellent in weather resistance. As another characteristic, PBT resin further include excellent thermostability, dimensional stability, chemical resistance, and so forth. Thermostability is a characteristic of a substance to resist thermal deformation even when exposed to a high-temperature environment for a long period of time. Dimensional stability is a characteristic of a substance to resist dimensional changes because the percentage of water absorption is low even when exposed to a humid environment. A term "chemical resistance" means a characteristic of a substance to resist alteration with respect to organic solvents, gasoline, oil, and so forth.

Note that the material of the case 21 is not restricted to PBT resin and another material such as, for example, polyphenylene sulfide resin (PPS resin) may be used as long as the material has excellent weather resistance as described above. Furthermore, since the cover 22 is also exposed to the same adverse environments as those of the case 21, the cover 22 may be formed of the same PBT resin or another material with excellent weather resistance (such as PPS resin). Still further, as exposed to adverse environments as described above, the case 21 and the cover 22 are fixed together by appropriate welding means for mutually melting and fixing the resin materials together.

Here, an electric motor (motor) 30 and a speed reduction mechanism 50 are accommodated in the case 21. In the following, prior to detailed description of the structure of the case 21, the structures of the electric motor 30 and the speed reduction mechanism 50 will be described in detail.

As shown in FIG. 5, the electric motor 30 includes a motor case 31. The motor case 31 is formed into a bottomed shape, substantially cylindrical shape by, for example, pressing a steel plate (magnetic material). Inside the motor case 31, magnets 32 (only two are shown in the drawing) each having a substantially-arc-shaped section are fixed. Inside the magnets 32, an armature 34 having a coil 33 wound therearound is rotatably accommodated via a predetermined gap (air gap).

At the rotation center of the armature 34, a base end side of an armature shaft (rotation shaft) 35 is fixed to the armature 34. A base end portion (upper side in the drawing) of the armature shaft 35 is arranged at a portion where a small-diameter bottom portion 31a of the motor case 31 is present, and a bearing member 36 is fixed to the inside of the small-diameter bottom portion 31a. The base end portion of the armature shaft 35 is rotatably supported by the bearing member 36. Here, as the bearing member 36, a ball bearing having an inner race, an outer race, and balls, a metal bearing (slide bearing) in which a fluororesin layer is formed inside a cylindrical steel pipe, or the like can be adopted.

On the other hand, a tip portion (lower side in the drawing) of the armature shaft 35 is arranged outside the motor case 31. To the tip portion of the armature shaft 35, a pinon gear 37 is fixed.

Between the armature 34 and the pinion gear 37 along the axial direction of the armature shaft 35, a commutator 38 electrically connected to an end portion of the coil 33 is fixed. On an outer peripheral portion of the commutator 38, paired brushes 39 slidably make contact. Note that the commutator 38 and each brush 39 are also accommodated inside the motor case 31.

With the parking brake switch operated at the time of stop of the vehicle, a driving current is supplied to each brush 39. Then, the driving current is supplied to the coil 33 via each brush 39 and the commutator 38, thereby generating an electromagnetic force in the armature 34. Thus, the armature shaft 35 (pinion gear 37) is driven to rotate to a predetermined direction with a predetermined number of revolutions. Here, the driving current to be supplied to each brush 39 is supplied from a vehicle-side connector (not shown) connected to a connector connecting portion 25 provided to the case 21.

As shown in FIG. 5, an output shaft 40 coupled to the male screw member 17b (see FIG. 2) so as to be integrally rotatable to transmit motive power of the electric motor 30 to the piston 17 is rotatably provided to the case 21. The output shaft 40 is adapted to output the rotation of the armature shaft 35, and integrally provided to a planetary carrier 56 forming the speed reduction mechanism 50. Therefore, the output shaft 40 transmits a rotary force with increased torque to the male screw member 17b. The armature shaft 35 and the output shaft 40 are provided to the case 21 so as to be aligned in parallel, and the speed reduction mechanism 50 is provided between the armature shaft 35 and the output shaft 40.

Also, between the speed reduction mechanism 50 and the pinion gear 37, an input-side two-stage gear 41 for transmitting motive power to the output shaft 40 aligned in parallel with the armature shaft 35 is provided. This input-side two-stage gear 41 includes a large-diameter gear 42 to be engaged with the pinion gear 37 and a small-diameter gear 43 to be engaged with a large-diameter gear 52 of an output-side two-stage gear 51 forming the speed reduction mechanism 50.

The speed reduction mechanism 50 is a planetary gear speed reduction mechanism, and has the output-side two-stage gear 51. This output-side two-stage gear 51 includes the large-diameter gear 52 to be engaged with the small-diameter gear 43 of the input-side two stage gear 41 and a small-diameter gear 53 functioning as a sun gear. Also, the speed reduction mechanism 50 includes four (only two are shown in the drawing) planetary gears 54. These planetary gears 54 are each engaged with both of the small-diameter gear 53 and an internal gear 55.

Each planetary gear 54 is rotatably supported to the planetary carrier 56 via a support pin 57. The internal gear 55 is fixed to the case 21 by insert molding, and the planetary carrier 56 is relatively rotatable with respect to the internal gear 55. With this, the rotation of the armature shaft 35 is transmitted via the input-side two-stage gear 41 and the output-side two-stage gear 51 to the speed reduction mechanism 50, and is decelerated by the speed reduction mechanism 50. Then, the rotary force decelerated by the speed reduction mechanism 50 to have increased torque is transmitted to the male screw member 17b (see FIG. 2) from the output shaft 40, thereby moving the piston 17 with a large force. Thus, by using the small-sized electric motor 30, an electrically-operated parking brake apparatus can be constructed.

As shown in FIGS. 3 to 5, the case 21 includes a caliper fixing portion 23 to be fixed to the cylinder portion 16d (refer to FIG. 2) of the caliper 16 and a motor accommodating portion (accommodating portion) 24 in which the electric motor 30 (refer to FIG. 5) is accommodated. The caliper fixing portion 23 is provided to a portion where the output shaft 40 of the case 21 is arranged, and is arranged coaxially with the output shaft 40 and the speed reduction mechanism 50. That is, the caliper fixing portion 23 rotatably supports the output shaft 40, configuring a support portion in the present invention. Also, the caliper fixing portion 23 is provided so as to be aligned with the motor accommodating portion 24 in a direction crossing its axial direction.

Inside the caliper fixing portion 23 in a radial direction, a cylindrical fixing portion 23a is provided. On a tip side of the cylindrical fixing portion 23a in the radial direction, a bottom side of the cylinder portion 16d fits in to be fixed. Also outside the caliper fixing portion 23 in the radial direction, an outer circumferential wall portion 23b forming portion of the outer hull of the case 21 is provided.

The motor accommodating portion 24 is formed in a cylindrical shape with one end side (upper side in the drawing) closed and the other end side (lower side in the drawing) open, and is provided to a portion of the case 21 where the electric motor 30 is arranged. The motor accommodating portion 24 has the electric motor 30 accommodated therein, and the motor accommodating portion 24 is arranged coaxially with the armature shaft 35 (refer to FIG. 5). The motor accommodating portion 24 includes a cylindrical main body portion 24a extending to the axial direction of the armature shaft 35 and a bottom wall portion 24b opposite to a cover 22 along an axial direction of the cylindrical main body portion 24a. Also, at a center portion of the bottom wall portion 24b, a bearing accommodating portion 24c protruding from the inside toward the outside of the motor accommodating portion 24 is provided. In this manner, one end side of the motor accommodating portion 24 is a step-shaped bottom portion.

The electric motor 30 is inserted into the inside of the motor accommodating portion 24 from its opening side (lower side in the drawing). Here, as shown in FIG. 5, the small-diameter bottom portion 31a in the motor case 31 of the electric motor 30 is arranged inside the bearing accommodating portion 24c. In this manner, the bearing member 36 is accommodated inside the bearing accommodating portion 24c via the small-diameter bottom portion 31a. The electric motor 30 is firmly fixed to the motor accommodating portion 24 by fastening means (not shown) so that they are not relatively rotatable with each other.

As shown in FIG. 3, a length L1 of the motor accommodating portion 24 in the axial direction is longer in dimension than a length L2 of the caliper fixing portion 23 in the axial direction (L1>L2). Here, the length L1 of the motor accommodating portion 24 in the axial direction is a length dimension from an opening 21a (see FIG. 5) of the case 21 to the bearing accommodating portion 24c of the motor accommodating portion 24, and the length L2 of the caliper fixing portion 23 in the axial direction is a length dimension from the opening 21a of the case 21 to a tip portion of the cylindrical fixing portion 23a of the caliper fixing portion 23. Also, the length L1 in the axial direction is substantially double the length L2 in the axial direction.

With this, the electric motor 30 can be arranged just beside the cylinder portion 16d so that the armature shaft 35 and the output shaft 40 are parallel to each other when the actuator 20 is fixed to the caliper 16, as shown in FIG. 1. Thus, it is possible to inhibit an increase of the dimension of the cylinder portion 16d in the axial direction to avoid a contact of the brake apparatus 10 with a shock absorber or the like.

Here, as shown in FIG. 5, the connector connecting portion 25 to which the vehicle-side connector is electrically connected is integrally provided on the side opposite to the fixing portion 23 interposing the accommodating portion 24 along a longitudinal direction (lateral direction in the drawing) of the case 21. The connector connecting portion 25 is oriented to the side opposite to the cylinder portion 16d, with the actuator 20 fixed to the caliper 16. With this, the vehicle-side connector can be easily and reliably connected to the connector connecting portion 25, with the brake apparatus 10 attached to the vehicle.

As shown in FIGS. 3 to 5, the caliper fixing portion 23 includes a cylindrical fixing portion 23a and an outer circumferential wall portion 23b. To the outer circumferential wall portion 23b, paired screw insertion portions 23c are integrally provided so as to partially protrude to the outside in a radial direction. That is, each screw insertion portion 23c is arranged outside the caliper fixing portion 23 in the radial direction. In each screw insertion portion 23c, a fixing screw "S" (refer to FIG. 1) for fixing the actuator 20 to the caliper 16 is inserted, and each screw insertion portion 23c is fixed to the caliper 16.

The screw insertion portions 23c are arranged so as to oppose each other with the cylindrical fixing portion 23a as a center. With this, as shown in FIG. 2, the actuator 20 is fixed to the caliper 16 with a uniform fixing force so that the axial center of the output shaft 40 is not shifted from the axial center of the piston 17. The screw insertion portions 23c are arranged with a predetermined space across the output shaft 40 with respect to a short direction of the case 21 crossing the longitudinal direction of the case 21.

As shown in FIGS. 3 and 4, between each of the screw insertion portions 23c and the outer circumferential wall portion 23b, a fixing-portion reinforcing rib 23d for enhancing fixing strength of each of the screw insertion portions 23c with respect to the outer circumferential wall portion 23b is integrally formed. With this, the case 21 is inhibited from rattling and twisted with respect to the caliper 16 at the time of operation of the actuator 20.

Also, outside the motor accommodating portion 24 in the radial direction, paired first reinforcing ribs 24d are integrally provided. These first reinforcing ribs 24d are provided so as to inhibit the motor accommodating portion 24 with the length L1 in the axial direction from being tilted (falling) toward the caliper fixing portion 23, or twisted with respect to the caliper fixing portion 23 with the length L2 in the axial direction, as shown in FIG. 3. Furthermore, since the case 21 is formed by injection molding of the resin material (PBT resin), the resin is shrunk to cause shrink marks at the time of curing. The first reinforcing ribs 24d each inhibit a tilt and distortion of the motor accommodating portion 24 with respect to the caliper fixing portion 23 due to the occurrence of shrink marks at the time of curing of the case 21.

Each first reinforcing rib 24d is provided from one end side (upper side in FIG. 3) to the other end side (lower side in FIG. 3) along the axial direction of the motor accommodating portion 24. Each first reinforcing rib 24d is formed to have a substantially triangularly-shaped section, and the amount of protrusion of each first reinforcing rib 24d to the outside of the motor accommodating portion 24 in the radial direction is gradually increased as going toward from the one end side to the other end side along the axial direction of the motor accommodating portion 24. This allows an upper mold 70 (refer to FIG. 6) for use in injection molding of the case 21 to be easily removed.

Also, each first reinforcing rib 24d is arranged on the same side as the caliper fixing portion 23 of the motor accommodating portion 24. Also, the protruding direction of each first reinforcing rib 24d is oriented to a relevant one of the screw insertion portions 23c of the caliper fixing portion 23, when the motor accommodating portion 24 is viewed from its axial direction. With this, each first reinforcing rib 24d is arranged in a dead space DS of the case 21. Thus, each first reinforcing rib 24d can be formed so as to be relatively large to enhance stiffness of the first reinforcing rib 24d itself.

Also, with the first reinforcing ribs 24d each arranged in the dead space DS of the case 21, while a tilt of the motor accommodating portion 24 toward a caliper fixing portion 23 is inhibited, the first reinforcing ribs 24d can be arranged so as to be close to each other in a range where the cylinder portion 16d and the motor accommodating portion 24 do not interfere with each other, that is, at a position evading the cylinder portion 16d. That is, the arrangement locations of the first reinforcing ribs 24d are those advantageous for reducing the size and weight of the brake apparatus 10.

As shown in FIG. 3, the other end portion of each of the first reinforcing ribs 24d in the axial direction of the motor accommodating portion 24 is directed to the outer circumferential wall portion 23b. Therefore, a stress loaded to each of the first reinforcing ribs 24d is escaped to the outer circumferential wall portion 23b via the screw insertion portions 23c. Thus, a tilt and twist of the motor accommodating portion 24 with respect to the caliper fixing portion 23 are more reliably inhibited. Here, the material thickness of the outer circumferential wall portion 23b along the axial direction of the output shaft 40 is thick, and stiffness of the outer circumferential wall portion 23b along the axial direction of the output shaft 40 is high. Also, the outer circumferential wall portion 23b is coupled to the screw insertion portions 23c. Therefore, the stress loaded from each of the first reinforcing ribs 24d inhibits the outer circumferential wall portion 23b from being deformed.

As shown in FIG. 3, a plurality of thinned portions 23e is provided to the caliper fixing portion 23. These thinned portions 23e are provided on the same side as a cylinder portion 16d (upper side in the drawing) of the caliper fixing portion 23 and on the periphery of the cylindrical fixing portion 23a. The thinned portions 23e are each disposed between the cylindrical fixing portion 23a and the outer circumferential wall portion 23b, and are arranged so as to be aligned in a circumferential direction of the cylindrical fixing portion 23a. The thinned portions 23e are each provided to prevent deformation due to shrink marks of the caliper fixing portion 23 and to reduce the weight of the case 21, and are provided so as to be recessed in the axial direction of the output shaft 40.

The thinned portions 23e are sectioned from one another by a plurality of radial ribs 23f radially provided, with the output shaft 40 taken as a center. The radial ribs 23g1 are provided between the cylindrical fixing portion 23a and the outer circumferential wall portion 23b, the radial ribs 23f are provided between the cylindrical fixing portion 23a and each of the screw insertion portions 23c, and the radial ribs 23f are provided between the cylindrical fixing portion 23a and the motor accommodating portion 24.

Also, among these radial ribs 23f, radial ribs 23f1 each between the cylindrical fixing portion 23a and the screw insertion portion 23c have a function of enhancing stiffness therebetween and inhibiting a twist and rattling with respect to the caliper 16 of the case 21. Also, among the radial ribs 23f, radial ribs 23f2 between the cylindrical fixing portion 23a and the motor accommodating portion 24 have a function of inhibiting a tilt and distortion with respect to the caliper fixing portion 23 of the motor accommodating portion 24.

Here, the paired first reinforcing ribs 24d are integrally provided so as to connect to the outer circumferential wall portion 23b at positions not overlapping the respective thinned portions 23e when the motor accommodating portion 24 is viewed from the axial direction. With this, the shape of the upper mold 70 (refer to FIG. 6) for use in injection molding of the case 21 can be simplified, and a stress loaded from each first reinforcing rib 24d is prevented from being loaded to the thinned portions 23e as thinned portions of the case 21.

As shown in FIGS. 3 to 5, a small flange portion (convex portion) 23g bulging to a direction orthogonal to the output shaft 40 is integrally provided on the opposite side of the caliper fixing portion 23 from the motor accommodating portion 24. That is, the small flange portion 23g protrudes in a direction crossing the output shaft 40 and opposite to the motor accommodating portion 24 of the caliper fixing portion 23. Also, a second reinforcing rib 24e is integrally provided on the opposite side of the motor accommodating portion 24 from the caliper fixing portion 23. Here, the second reinforcing rib 24e configures a reinforcing rib in the present invention.

The small flange portion 23g is formed at the time of injection molding of the case 21 so as to oppose a gate G for injecting molten resin (molten material) MR into a cavity CA in the upper mold 70 and a lower mold 60 and, as shown in FIG. 6, forms an inlet portion to the inside of the upper and lower molds 70 and 60 for the molten resin MR. The small flange portion 23g is provided so as to protrude from the outer circumferential wall portion 23b of the caliper fixing portion 23 to the outside in the radial direction, and has a substantially trapezoidal section.

On the other hand, the second reinforcing rib 24e is provided at a weld line (merging portion) WL portion formed by the merger of molten resin (molten material) MR. That is, the weld line WL is formed on the second reinforcing rib 24e provided so as to protrude from the motor accommodating portion 24 to the outside. By providing the second reinforcing rib 24e in this manner, the strength of the weld line WL is improved.

The thickness dimension of the second reinforcing rib 24e is set to be substantially equal to those of the paired first reinforcing ribs 24d. As with each first reinforcing rib 24d, the second reinforcing rib 24e also includes a function of inhibiting a tilt and distortion with respect to the caliper fixing portion 23 of the motor accommodating portion 24. In this manner, as a matter of course, the second reinforcing rib 24e reinforces the motor accommodating portion 24 together with each first reinforcing rib 24d, and also compensates for a decrease in strength of the case 21 due to a by-product in manufacturing the case 21, that is, formation of the weld line WL (refer to FIG. 8).

The second reinforcing rib 24e includes a vertical portion 24f provided from one end side (upper side in FIG. 3) along the axial direction of the motor accommodating portion 24 to the other end side (lower side in FIG. 3) and a horizontal portion 24g provided between the cylindrical main body portion 24a and the bearing accommodating portion 24c of the motor accommodating portion 24. That is, the second reinforcing rib 24e is formed as following the cylindrical main body portion 24a and the bottom wall portion 24b to extend to the bearing accommodating portion 24c.

The horizontal portion 24g has one end side (left side in FIG. 3) integrally coupled to the bearing accommodating portion 24c and the other end side (right side in FIG. 39) integrally coupled to one end side of the vertical portion 24f. With this, the bearing accommodating portion 24c is also reinforced to prevent distortion and so forth of the bearing accommodating portion 24c. Also as shown in FIG. 5, the height of protrusion from the bottom wall portion 24b of the horizontal portion 24g is equal to the height of protrusion from the bottom wall portion 24b of the bearing accommodating portion 24c. With this, while an increase in dimension of the motor accommodating portion 24 in the axial direction is inhibited, an improvement in strength of the bearing accommodating portion 24c and, furthermore, an improvement in strength of the portion where the weld line WL of the bottom wall portion 24b is formed are achieved.

The vertical portion 24f has the other end side integrally coupled to a third reinforcing rib 23k for partitioning the paired thinned portions 23h formed between the motor accommodating portion 24 and the connector connecting portion 25 along the longitudinal direction of the case 21. Here, the thinned portions 23h are each provided to prevent deformation due to shrink marks of the motor accommodating portion 24 and to reduce the weight of the case 21, and are provided so as to be recessed in the axial direction of the output shaft 40, as with each thinned portion 23e. Also, by cooperating with the second reinforcing rib 24e, the third reinforcing rib 23k achieves, as with each radial rib 23f2, the function of inhibiting a tilt and distortion with respect to the caliper fixing portion 23 of the motor accommodating portion 24 and also achieves an improvement in strength of the portion where the weld line WL of the cylindrical main body portion 24a is formed.

Furthermore, as shown in FIG. 5, a height of protrusion h1 of the vertical unit 24f from the cylindrical main body portion 24a on one end side is set to be slightly smaller than a height of protrusion h2 of the vertical portion 24f from the cylindrical main body portion 24a on the other end side (h1<h2). More specifically, the height of protrusion from the cylindrical main body portion 24a of the vertical portion 24f is gradually increased from one end side toward the other end side of the motor accommodating portion 24 along the axial direction. With this, as with each first reinforcing rib 24d, mold removal of the upper mold 70 (refer to FIG. 6) for use in injection molding of the case 21 can be easily made.

Next, a procedure of manufacturing the case 21 forming part of the actuator 20 is described by using the drawings.

As shown in FIG. 6, the lower mold 60 is to mold an opening 21a side (refer to FIG. 5) of the case 21, and is fixed to a base (not shown) of an injection molding apparatus. That is, the lower mold 60 is a fixed mold. On the other hand, the upper mold 70 is to mold a motor accommodating portion 24 of the case 21, and vertically moves by a driving mechanism (not shown) such as a hydraulic cylinder mounted on the injection molding apparatus. That is, the upper mold 70 is a mobile mold, approaching or being separated away from the lower mold 70. Also, in the upper mold 70, a supply passage 71 where the molten resin MR passes is formed. To the supply passage 71, a dispenser DP which pumps the molten resin MR to the supply passage 71 is connected.

Furthermore, a slide mold 80 movable in a lateral direction with respect to the upper mold 70 and the lower mold 60 is provided. The slide mold 80 slides on the base by the driving mechanism such as a hydraulic cylinder mounted on the injection molding apparatus. The slide mold 80 is provided with a connector molding convex portion 81 for molding the inside of the connector connecting portion 25 of the case 21. The connector molding convex portion 81 is set near a parting line PL formed by butting the upper mold 70 and the lower mold 60 together and in a recess (not shown) of the lower mold 60 via a predetermined gap.

[Mold Preparing Process] Then, to manufacture the case 21, firstly, an internal gear 55 or the like provided by insert molding is set to the lower mold 60 (details are not shown). Then, the driving mechanism is actuated to butt the upper mold 70 against the lower mold 60, as indicated by an arrow (1) in the drawing. Also, the driving mechanism is actuated to move the slide mold 80 toward the lower mold 60 to insert the connector molding convex portion 81 in the recess of the lower mold 60, as indicated by an arrow (2) in the drawing. With this, the cavity CA for forming the case 21 is formed inside the upper mold 70 and the lower mold 60.

[Filling process] Next, the dispenser DP is actuated to supply the molten resin MR (PBT resin) to the supply passage 71 of the upper mold 70 at a predetermined pressure, as indicated by an arrow (3) in the drawing. With this, from the gate G at the tip of the supply passage 71 of the upper mold 70, the molten resin MR is supplied to the inside of the cavity CA, as indicated by broken arrows in the drawing. Here, the molten resin MR to be supplied to the inside of the cavity CA first collides with a step portion 61 provided to the lower mold 60. With this, the travelling direction of the molten resin MR to be supplied to the inside of the cavity CA is bent (obstructed), and then the inside of the cavity CA is filled with the molten resin MR. By bending the travelling direction of the molten resin MR in this manner, an occurrence of a "jetting phenomenon", which is an outer-appearance molding failure phenomenon, is inhibited. Here, the "jetting phenomenon" is a phenomenon in which the molten resin meanders to form a meandering linear pattern on a surface of a molded product.

The molten resin MR supplied to the inside of the cavity CA is then diverted at a center line."C" as a boundary as shown in FIG. 7, thereby gradually forming the motor accommodating portion 24. Here, the center line "C" is a straight line extending in the longitudinal direction of the case 21 and, as shown in FIG. 5, passing the axial center of the output shaft 40 and the axial center of the armature shaft 35. Also, at the center line "C" as a boundary, the case 21 has a shape symmetrical in a mirror image. With this, the molten resin MR supplied from the supply passage 71 on the center line "C" is accurately diverted at substantially 50:50.

Next, the molten resin MR diverted at the center line "C" as a boundary forms the motor accommodating portion 24, and then enters a portion of the cavity CA provided on the center line "C", the portion where the second reinforcing rib 24e is to be molded. Then, the molten resin MR merges at the portion of the cavity CA where the second reinforcing rib 24e is to be molded.

With this, the inside of the cavity CA is filled with the molted resin MR and, with the molten resin MR colliding with the step portion 61, the small flange portion 23g (refer to FIG. 5) as a convex portion is formed on the same side as a supply passage 71 of the cavity CA, and the weld line WL is formed on the opposite side of the cavity CA from the supply passage 71 and at the portion of the second reinforcing rib 24e. As shown in FIG. 5, the portion where the weld line WL is formed (the second reinforcing rib 24e) has a material thickness dimension thickened, compared with other portions of the case 21. Therefore, the strength of the weld line WL is sufficiently enhanced.

[Cooling Process] Then, after the inside of the cavity CA is filled with the molten resin MR without a gap, the dispenser DP is stopped to cool the molten resin MR for curing. Here, to cure the molten resin MR, the molten resin may be left for a predetermined period of time, or may be forcibly cooled by a cooling apparatus (not shown).

[Removing Process] Next, after molten resin MR is cured, the driving mechanism is actuated to pull out the slide mold 80 from the upper mold 70 and the lower mold 60, and the upper mold 70 is separated away from the lower mold 60. Then, an extrusion pin (not shown) provided to the lower mold 60 is ascended to remove the cured and completed case 21 from the upper mold 70 and the lower mold 60. Thus, manufacture of the case 21 ends.

As has been described in detail above, according to the first embodiment, since the second reinforcing rib 24e protruding from the motor accommodating portion 24 to the outside is provided to the weld line WL portion formed by the merger of molten resins MR, the material thickness of the portion where the weld line WL is formed can be increased. Therefore, the strength of the weld line WL portion is improved and, in turn, the strength of the case 21 as a whole can be improved. Since the case 21 sufficiently resistible to outer shocks can be achieved, the case 21 can be sufficiently used even in adverse environments such as a place near an undercarriage of a vehicle, and high reliability can be obtained.

Also, since the small flange portion 23g is provided on the same side as the caliper fixing portion 23 which supports the output shaft 40 where large running torque is loaded, the weld line WL can be kept away from the caliper fixing portion 23, with the small flange portion 23g taken as an inlet portion for the molten resin MR. Thus, with the caliper fixing portion 23 of the case 21 inhibited from being distorted, it is possible to reliably inhibit unusual noise and so forth from occurring from the actuator 20.

Furthermore, according to the first embodiment, the motor accommodating portion 24 has a cylindrical shape with one end side closed and the other end side open, and the second reinforcing rib 24e is provided from one end side to the other end side of the motor accommodating portion 24. Therefore, it is possible to reliably inhibit a tilt and distortion with respect to the caliper fixing portion 23 of the motor accommodating portion 24, and also reliably improve the strength of the portion of the cylindrical main body portion 24a where the weld line WL is formed.

Still further, according to the first embodiment, the armature shaft 35 is rotatably supported by the bearing member 36, the bearing accommodating portion 24c in which the bearing member 36 is accommodated is provided on one end side of the motor accommodating portion 24, and the second reinforcing rib 24e extends to the bearing accommodating portion 24c. Therefore, it is possible to reliably improve the strength of the bearing accommodating portion 24c and, furthermore, improve the strength of the portion of the bottom wall portion 24b where the weld line WL is formed.

Yet still further, according to the first embodiment, the height of protrusion of the second reinforcing rib 24e with respect to the motor accommodating portion 24 is gradually increased from one end side toward the other end side of the motor accommodating portion 24. Therefore, the upper mold 70 can be easily removed after the case is injection-molded.

Yet still further, according to the first embodiment, since the portion of the case 21 where the weld line WL is formed can be reinforced, it is possible to sufficiently use the present invention as an actuator for use in adverse environments, that is, the actuator 20 of the brake apparatus 10 which causes the piston 17 to perform reciprocating motions by the output shaft 40.

Next, the second embodiment of the present invention will be described in detail by using the drawings. Note that portions the same in function as those of the first embodiment are respectively denoted by the same reference numbers as those of the first embodiment, and detail description thereof is omitted in this embodiment.

Figure 9:
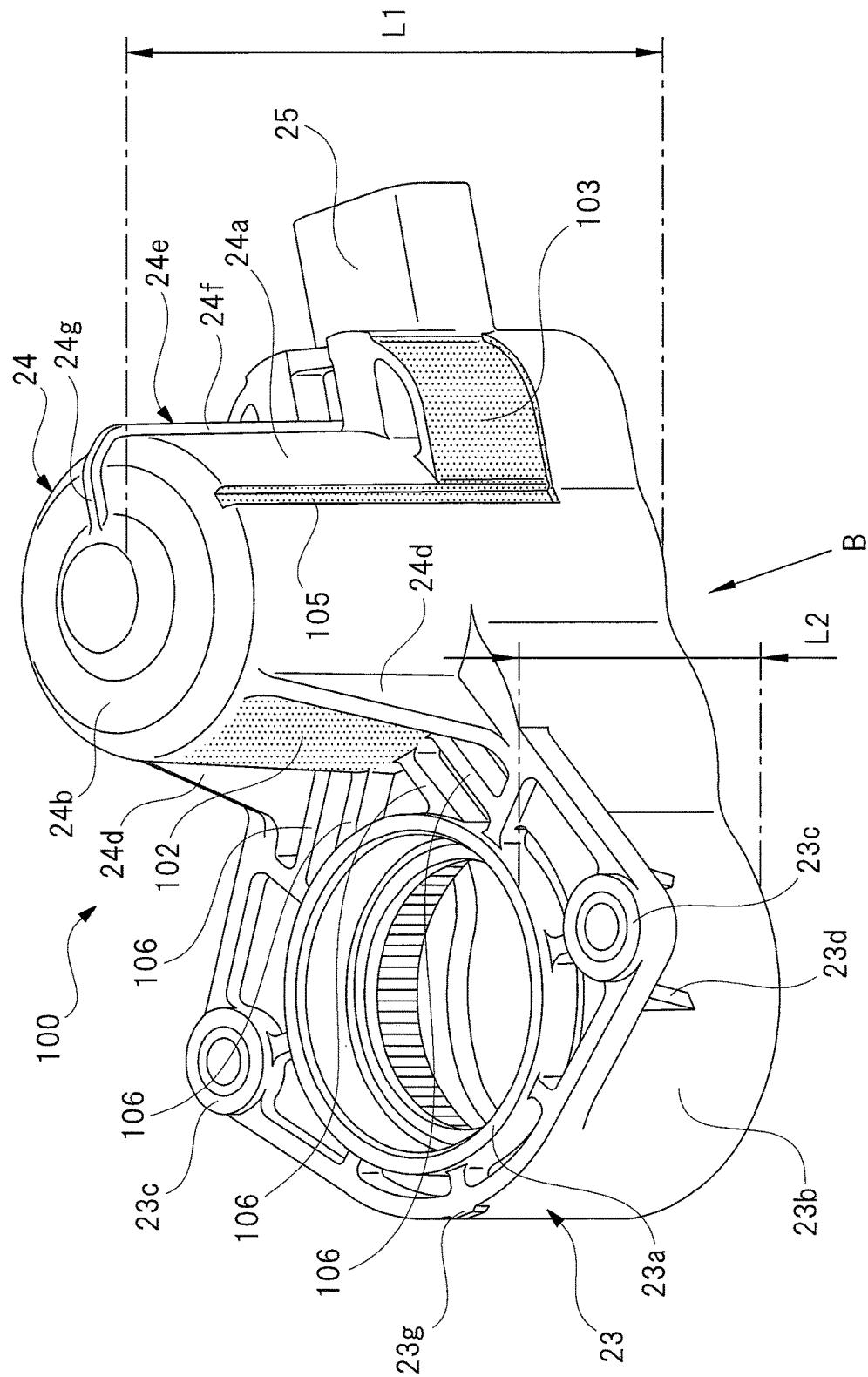
FIG. 9 is a perspective view showing an outer appearance of a case of an actuator of a second embodiment.
Figure 10:
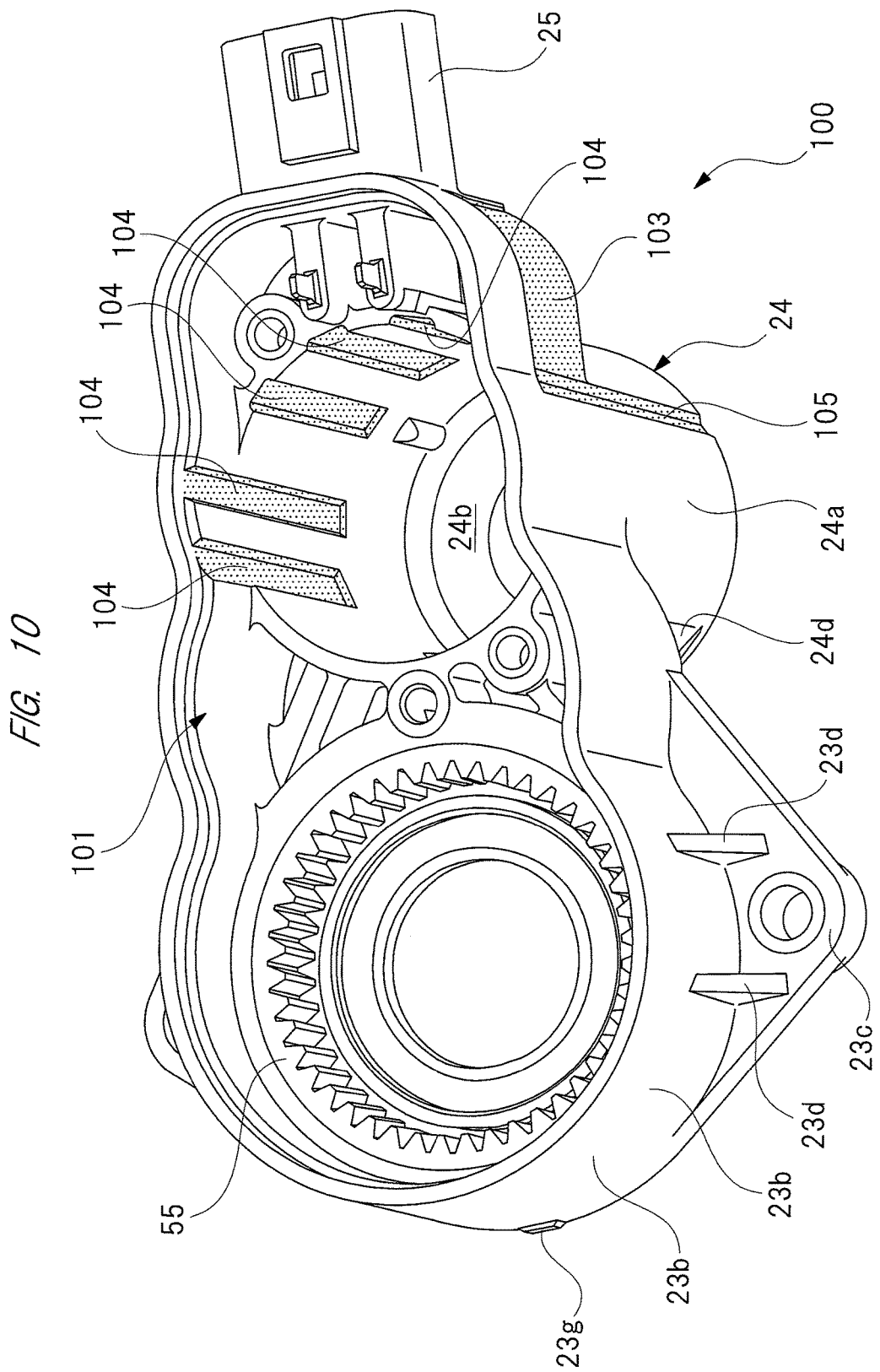
FIG. 10 is a perspective view showing the inside of the case of FIG. 9.
Figure 11:
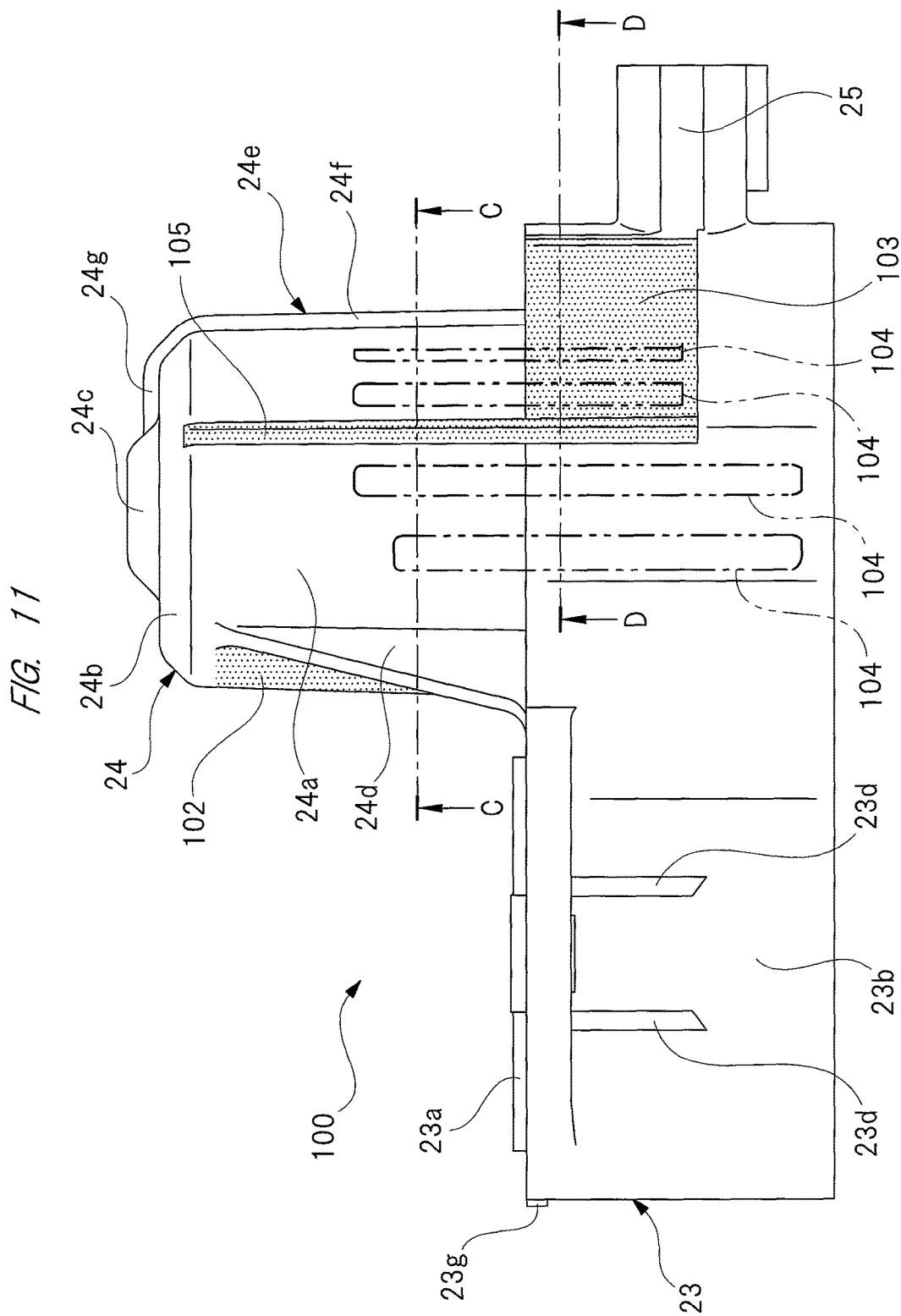
FIG. 11 is a view along an arrow "B" of FIG. 9.
Figure 12:
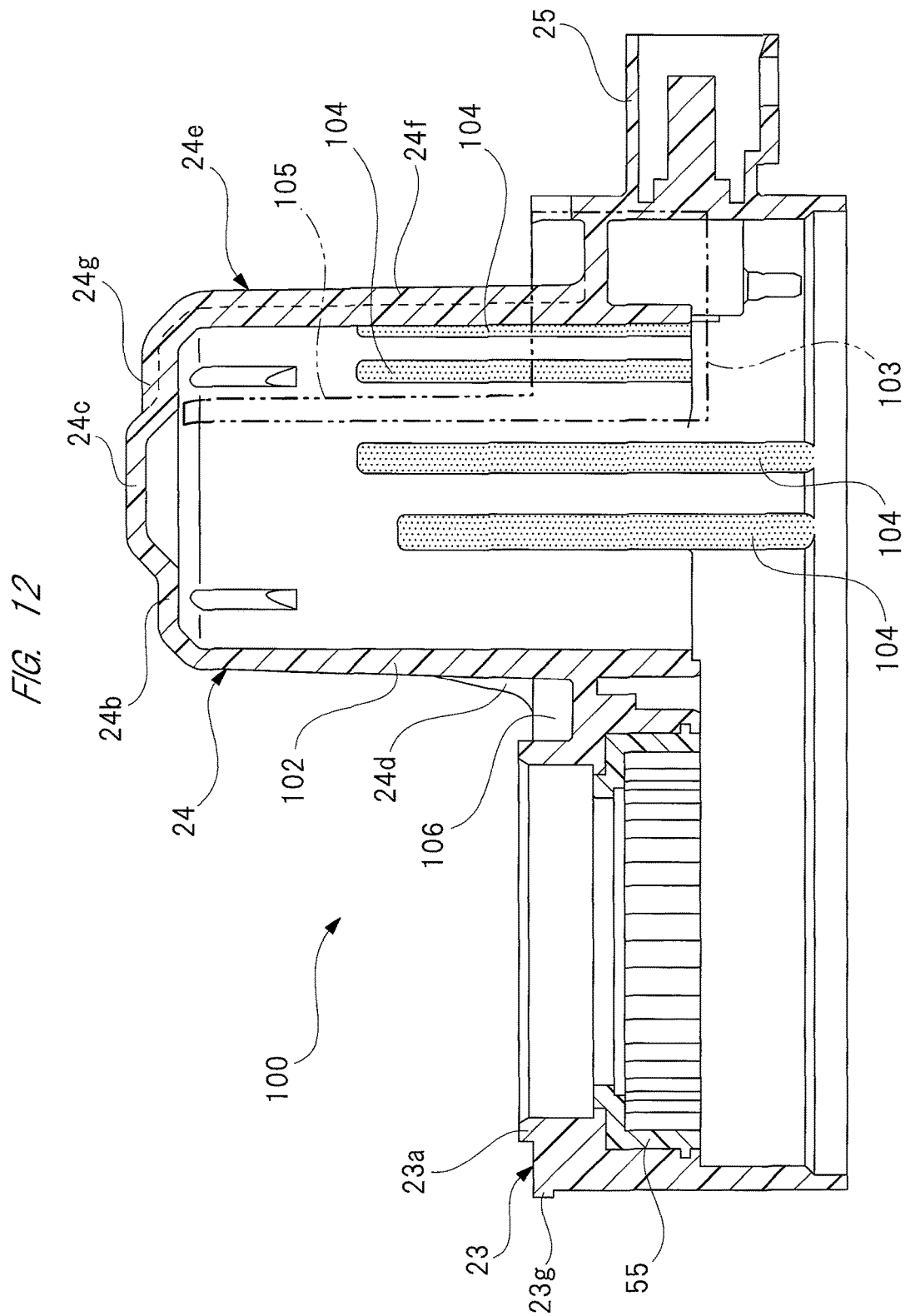
FIG. 12 is a sectional view along a longitudinal direction of the case of FIG. 9.
Figure 13:
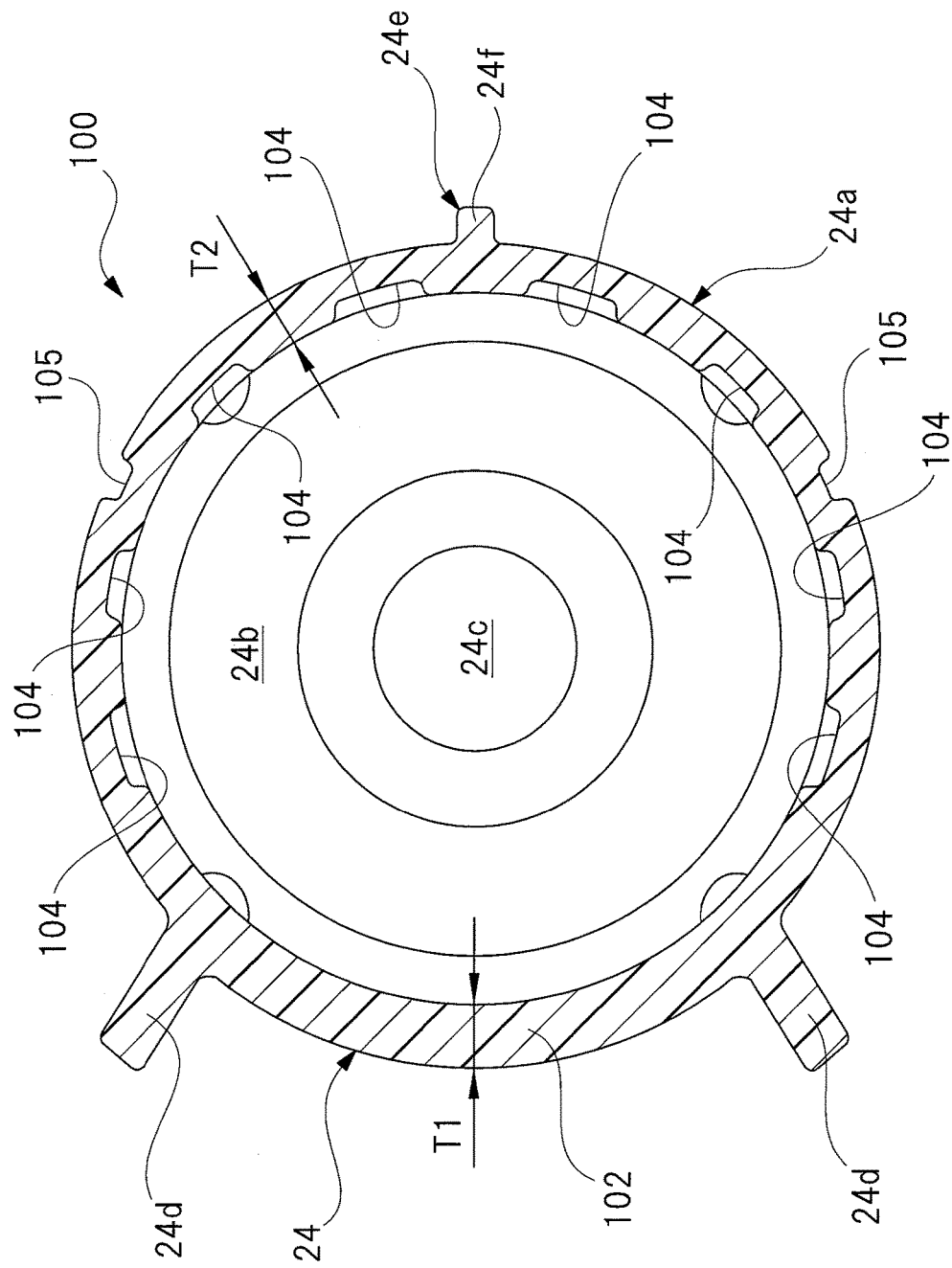
FIG. 13 is a sectional view along a C-C line of FIG. 11.
Figure 14:
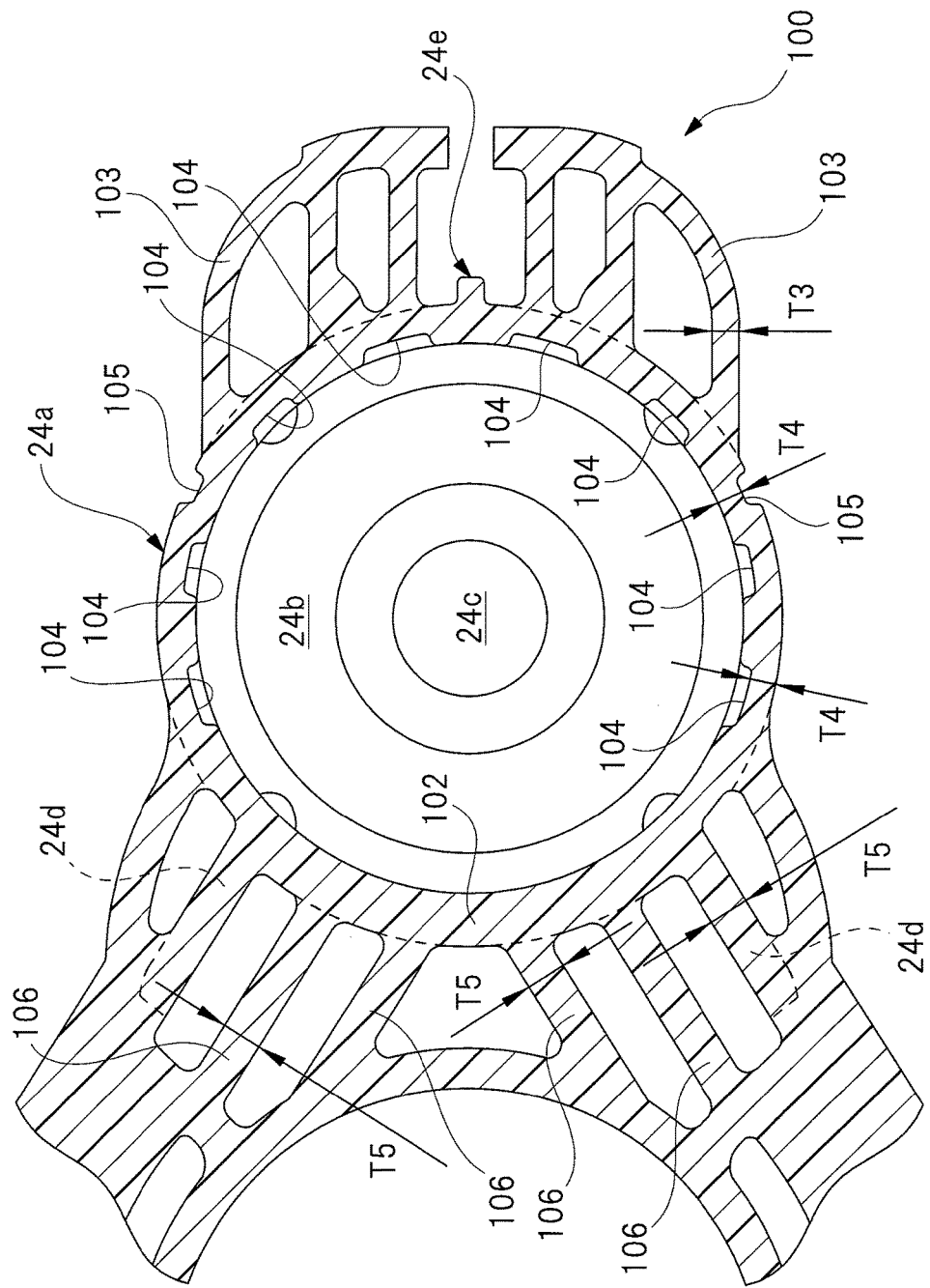
FIG. 14 is a sectional view along a D-D line of FIG. 11.
Figure 15:
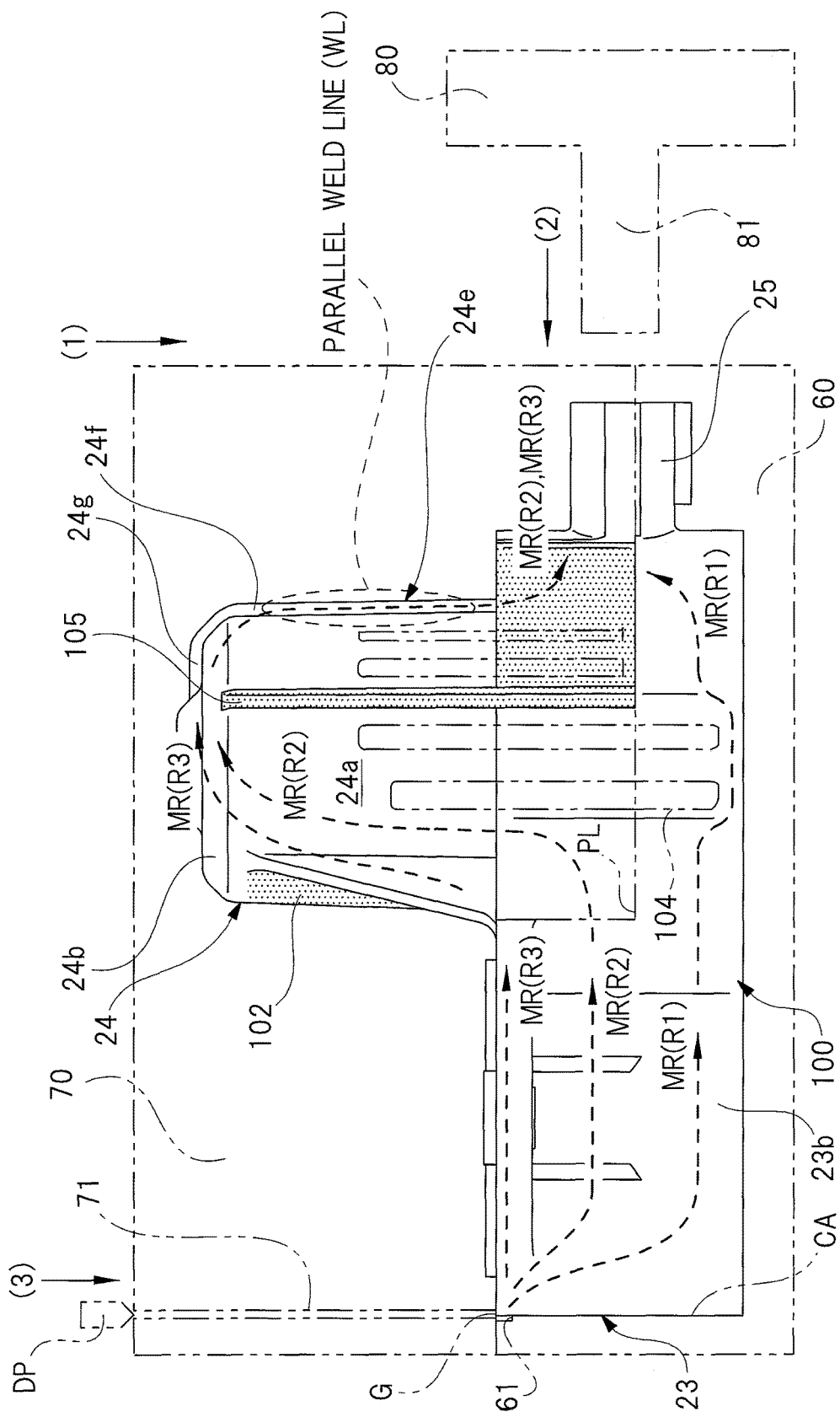
FIG. 15 is a side view describing a manufacturing procedure of the case of FIG. 9.
Figure 16:
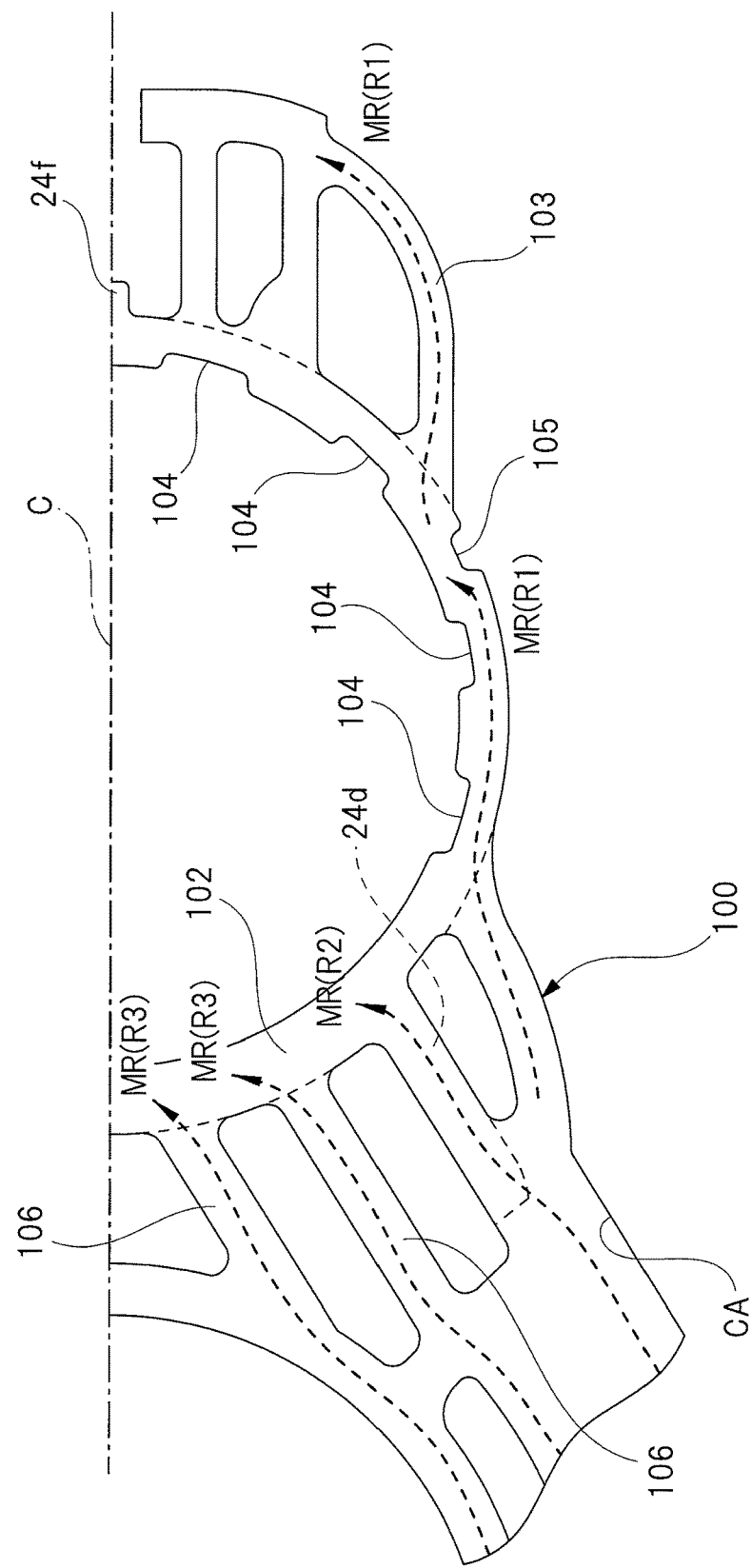
FIG. 16 is a partially enlarged plan view describing the manufacturing procedure of the case of FIG. 9.

FIG. 9 is a perspective view showing an outer appearance of a case of an actuator of a second embodiment, FIG. 10 is a perspective view showing the inside of the case of FIG. 9, FIG. 11 is a view along an arrow "B" of FIG. 9, FIG. 12 is a sectional view along a longitudinal direction of the case of FIG. 9, FIG. 13 is a sectional view along a C-C line of FIG. 11, FIG. 14 is a sectional view along a D-D line of FIG. 11, FIG. 15 is a side view describing a manufacturing procedure of the case of FIG. 9, and FIG. 16 is a partially enlarged plan view describing the manufacturing procedure of the case of FIG. 9.

An actuator of the second embodiment is different from the actuator 20 of the first embodiment (refer to FIG. 3) only in the structure of a case 100 and the shape of a cover (not shown) hermetically closing an opening 101 of the case 100. The cover of the actuator of the second embodiment has the same functions as those of the cover 22 of the first embodiment (refer to FIG. 5) but is different therefrom only in shape, and therefore is not described in detail herein.

As shown in FIGS. 9 and 10, as with the case 21 (refer to FIG. 3) of the first embodiment, the case 100 is formed of PBT resin in a substantially L-shape, and includes the caliper fixing portion 23 and the motor accommodating portion 24. Also, as with the case 21 of the first embodiment, the length L1 of the motor accommodating portion 24 in the axial direction is longer than the length L2 of the caliper fixing portion 23 in the axial direction (L1>L2). Also, the connector connecting portion 25 is integrally provided to the side (right side in the drawing) opposite to the motor accommodating portion 24 of the second reinforcing rib 24e.

On the same side as a caliper fixing portion 23 of the cylindrical main body portion 24a where the motor accommodating portion 24 is formed, a thick portion 102 is provided, as indicated by a dotted portion of FIG. 9. That is, the thick portion 102 is arranged between the caliper fixing portion 23 and the motor accommodating portion 24 of the case 100. As shown in FIG. 13, the thick portion 102 is arranged between the paired first reinforcing ribs 24d along the circumferential direction of the cylindrical main body portion 24a, and a material thickness dimension T1 of the thick portion 102 is set to be thicker than a material thickness dimension T2 of another portion of the cylindrical main body portion 24a where nothing is formed (T1>T2). This means that the molten resin MR (refer to FIG. 15) can flow through the thick portion 102 portion (the thickness dimension T1) more easily than the portion of the cylindrical main body portion 24a where nothing is formed (the thickness dimension T2) at the time of injection molding of the case 100.

Also, on the same side as the connector connecting portion 25 of the cylindrical main body portion 24a, thin portions 103 are provided, as indicated by a dotted portion of FIG. 9. That is, the thin portions 103 are arranged between the motor accommodating portion 24 and the connector connecting portion 25 of the case 100. More specifically, the thin portions 103 are arranged between the motor accommodating portion 24 and the connector connecting portion 25 and are extended from the caliper fixing portion 23 along the longitudinal direction of the case 100. Also, as shown in FIG. 14, the thin portions 103 are provided in a pair so as to oppose a short direction crossing the longitudinal direction of the case 100. Also, as shown in FIG. 14, the thin portions 103 each have a thickness dimension T3 set to be thinner than the material thickness dimension T2 (refer to FIG. 13) of the portion of the cylindrical main body portion 24a where nothing is formed (T1>T2>T3). This means that the molten resin MR (refer to FIG. 15) can flow through the portion of the cylindrical main body portion 24a where nothing is formed (the thickness dimension T2) more easily than the thin portion 103 portion (the thickness dimension T3) at the time of injection molding of the case 100. That is, the molten resin MR can flow through the thick portion 102 portion (the thickness dimension T1) more easily than the thin portion 103 portion (the thickness dimension T3).

Here, as shown in FIG. 11, the thick portion 102 is arranged on a bottom wall portion 24b side of the motor accommodating portion 24 along the axial direction. On the other side, the thin portions 103 are arranged on the same side as an opening 101 of the case 100 (lower side in the drawing). More specifically, the position where the thick portion 102 is arranged and the positions where the thin portions 103 are arranged are described as follows. That is, the thick portion 102 is arranged between the caliper fixing portion 23 and the motor accommodating portion 24 (on the same side as a small flange portion 23g of the cylindrical main body portion 24a) and on the same side as a bottom wall portion 24b. On the other hand, the thin portions 103 are arranged between the motor accommodating portion 24 and the connector connecting portion 25 (on the same side as a second reinforcing rib 24e of the cylindrical main body portion 24a) and on the same side as the opening 101 (lower side in the drawing).

With this, as shown in FIGS. 15 and 16, a flow route of the molten resin MR at the time of injection molding of the case 100 includes a lower flow route R1, an intermediate-portion flow route R2, and an upper flow route R3, the molten resin MR can be let flow through the intermediate-portion flow route R2 and the upper flow route R3 more than the lower flow route R1. In other words, as shown in FIG. 15, a portion of the cavity CA where the bottom wall portion 24b is formed can become quickly filled with the molten resin MR.

As shown in FIGS. 10 and 12, inside the motor accommodating portion 24 in the radial direction, a plurality of inner groove portions 104 (dotted portions) extending to the axial direction of the motor accommodating portion 24.

With this, the material thickness of a portion of the case 100 where the inner groove portions 104 are formed, that is, a portion of the cylindrical main body portion 24a where the inner groove portions 104, is thinned. Here, as shown in FIG. 14, a material thickness dimension T4 of the portion of the cylindrical main body portion 24a where the inner groove portions 104 are formed is set to be thinner than the material thickness dimension T2 (refer to FIG. 13) of the portion of the cylindrical main body portion 24a where nothing is formed (T4<T2). Note that the material thickness dimension T4 of the portion of the cylindrical main body portion 24a where the inner groove portions 104 are formed and the thickness dimension T3 of each thin portion 103 are set to be substantially equal to each other (T4≈T3).

As shown in FIGS. 10 and 12, the plurality of inner groove portions 104 are arranged on the same side as a connector connecting portion 25 along the circumferential direction of the motor accommodating portion 24 and on the same side as a connector connecting portion 25 along the axial direction of the motor accommodating portion 24. Also, the plurality of inner groove portions 104 are arranged at predetermined intervals in the circumferential direction of the motor accommodating portion 24. With this, while a decrease in strength of the motor accommodating portion 24 is inhibited, the molten resin MR flowing through the lower flow route R1 (refer to FIG. 15) is made less prone to flow at the time of injection molding of the case 100, thereby delaying arrival of the molten resin MR at the portion of the cavity CA where the connector connecting portion 25 is formed.

Here, as shown in FIG. 12, among the plurality of inner groove portions 104, the inner groove portions 104 near the caliper fixing portion 23, that is, the inner groove portions 104 closest to the thick portion 102, are provided each at a position away from the bottom wall portion 24b more than the other inner groove portions 104. That is, the height of protrusion of each inner groove portions 104 closest to the thick portion 102 with respect to the bottom wall portion 24b is smaller than the height of protrusion of each of the other inner groove portions 104 with respect to the bottom wall portion 24b. With this, the flow of the lower flow route R1 (refer to FIG. 15) is made less prone to flow without inhibiting the flows of the intermediate-portion flow route R2 and the upper flow route R3 (refer to FIG. 15) at the time of injection molding of the case 100. That is, by adjusting the number and length of the inner groove portions 104 as appropriate, a balance (balance in flow rate and flow velocity) between the flow states of the intermediate-portion flow route R2 and the upper flow route R3 and the flow state of the lower flow route R1 can be adjusted.

As shown in FIGS. 9 to 11, outside the motor accommodating portion 24 in the radial direction and in a portion of the motor accommodating portion 24 near the connector connecting portion 25 along the circumferential direction, outer groove portions 105 (dotted portions) extending to the axial direction of the motor accommodating portion 24 are formed. Each outer groove portion 105 has a base end side in a longitudinal direction continuously connected to the thin portion 103. That is, as with the thin portions 103, the outer groove portions 105 are provided also in a pair so as to oppose the short direction crossing the longitudinal direction of the case 100 (refer to FIG. 14). In each outer groove portion 105, the material thickness of a portion of the case 100 where the outer groove portion 105 is formed, that is, a portion of the cylindrical main body portion 24a where the outer groove portion 105 is formed, is thinned. Here, as shown in FIGS. 11 and 12, the locations of arrangement of the outer groove portions 105 with respect to the cylindrical main body portion 21a in the circumferential direction are between the inner groove portions 104 along the circumferential direction of the cylindrical main body portion 24a. As shown in FIG. 14, the material thickness dimension T4 of the portion of the cylindrical main body portion 24a where the outer groove portion 105 is formed is equal to the material thickness dimension T4 of the portion of the cylindrical main body portion 24a where the inner groove portion 104 is formed. However, the material thickness dimension of the portion of the outer groove portion 105 and the material thickness dimension of the portion of the inner groove portion 104 may be different from each other.

As shown in FIGS. 9 to 11, the outer groove portions 105 are provided over a substantially entire region of the cylindrical main body portion 24a along the axial direction. That is, a tip side of each outer groove portion 105 in the longitudinal direction extends to the bottom wall portion 24b of the motor accommodating portion 24 (refer to FIG. 12). Here, since the outer groove portions 105 are formed by using the upper mold 70 (refer to FIG. 15), release of the upper mold 70 is not hindered even if the outer groove portions 105 are provided over the substantially entire region of the cylindrical main body portion 24a along the axial direction. That is, a so-called "undercut", which makes release of the upper mold 70 impossible, does not occur in the shape of each outer groove portion 105. Note that the function of the outer groove portions 105 are substantially identical to that of the inner groove portions 104 and, in particular, the outer groove portions 105 causes the molten resin MR to flow toward the horizontal portion 24g of the second reinforcing rib 24e so as to quickly reach there at the time of injection molding of the case 100.

Here, as shown in FIG. 10, the outer circumferential wall portion 23b forming the outer hull of the case 100 is shaped in a substantially wavy shape. With this, while the input-side two-step gear 41 and the output-side two-step gear 51 (refer to FIG. 5) can be accommodated inside the case 100, the molten resin MR on the lower flow route R1 is made less prone to flow at the time of injection molding of the case 100.

As shown in FIGS. 9 and 14, four auxiliary ribs 106 in total are provided between the motor accommodating portion 24 and the caliper fixing portion 23 along the longitudinal direction of the case 100. These auxiliary ribs 106 extend between the outside of the caliper fixing portion 23 in the radial direction (cylindrical fixing portion 23a) and the axial center portion (center axis) of the motor accommodating portion 24. With this, the auxiliary ribs 106 are tilted at a predetermined angle with respect to the longitudinal direction of the case 100 and extend toward the center axis of the motor accommodating portion 24. Here, as shown in FIG. 14, a material thickness dimension T5 of each auxiliary rib 106 is set equal to a material thickness dimension T5 of the first reinforcing rib 24d. However, the material thickness dimension of the auxiliary rib 106 and the material thickness dimension of the first reinforcing rib 24d may be different from each other.

The auxiliary ribs 106 are to enhance stiffness between the motor accommodating portion 24 and the caliper fixing portion 23 along the longitudinal direction of the case 100. That is, the auxiliary ribs 106 have the same function as that of the radial ribs 23f2 (refer to FIG. 3) of the first embodiment described above. In addition, the auxiliary ribs 106 has a function of orienting, in particular, the upper flow route R3 of the molten resin MR toward the portion of the cavity CA where the thick portion 102 is formed at the time of injection molding of the case 100, as shown in FIG. 16. That is, by providing the auxiliary ribs 106 tilted with respect to the longitudinal direction of the case 100, while the molten resin MR flowing through, in particular, the upper flow route R3 is made prone to flow, the flow of the molten resin MR on the lower flow route R1 is made less prone to flow. Note that the paired first reinforcing ribs 24*d* also orient, in particular, the intermediate-portion flow route R2 of the molten resin MR, toward the portion of the cavity CA where the thick portion 102 is formed at the time of injection molding of the case 100, thereby functioning substantially similarly to the auxiliary ribs 106.

Next, a procedure of manufacturing the case 100 of the second embodiment as described above is described by using the drawings.

In [Filling Process] for the case 100, the molten resin MR flows inside the cavity CA as indicated by broken arrows in FIGS. 15 and 16. Specifically, the molten resin MR supplied from the gate G via the step portion 61 to the inside of the cavity CA can be broadly divided into the lower flow route R1 flowing through a lower portion of the lower mold 60, the intermediate-portion flow route R2 flowing through an intermediate portion of the lower mold 60, and the upper flow route R3 flowing through an upper portion of the lower mold 60.

The lower flow route R1 is a route substantially linearly proceeding through the lower portion of the cavity CA to connect to the portion of the cavity CA where the connector connecting portion 25 is formed at the shortest distance. In the course of this lower flow route R1, the portion where the substantially-wavy-shaped outer circumferential wall portion 23*b* (refer to FIG. 10) is formed and the portion of the cylindrical main body portion 24*a* where the inner groove portions 104 (material thickness dimension T4) are formed are arranged. With this, the molten resin MR flowing through the lower flow route R1 becomes less prone to flow and, for example, flows at a low flow velocity L (m/s). In this manner, the portion where the substantially-wavy-shaped outer circumferential wall portion 23*b* is formed and the portion of the cylindrical main body portion 24*a* where the inner groove portions 104 are formed exert a so-called "diaphragm effect", thereby decreasing the flow velocity of the molten resin MR flowing through the lower flow route R1.

The molten resin MR flowing through the intermediate-portion flow route R2 substantially linearly proceeds through the intermediate portion of the cavity CA and is then oriented by the portion of the cylindrical main body portion 24*a* where the inner groove portions 104 are formed (diaphragm portion) toward the portion of the cavity CA where the bottom wall portion 24*b* is formed (upper side). Here, on the upper side of the intermediate-portion flow route R2, the portion of the cavity CA where the thick portion 102 is formed is present. On the lower side of the intermediate-portion flow route R2, the molten resin MR flowing through the lower flow route R1 with decreased flow velocity is present. With this, the molten resin MR flowing through the intermediate-portion flow route R2 is oriented toward the portion (upper side) of the cavity CA where the bottom wall portion 24*b* is formed. Note that the flow velocity of the molten resin MR flowing through the intermediate-portion flow route R2 is an intermediate flow velocity M (m/s) larger than the flow velocity of the molten resin MR flowing through the lower flow route R1 (M>L).

Here, of the molten resin MR flowing through the intermediate-portion flow route R2, a slight amount of the molten resin MR flows through the portion of the cavity CA where the inner groove portions 104 are formed and the portion where the thin portions 103 are formed to substantially linearly reach the portion of the cavity CA where the connector connecting portion 25 is formed. Then, since this slight amount of the molten resin MR flows through not only the portion of the cavity CA where the inner groove portions 104 are formed but also the portion of the cavity CA where the thin portions 103 are formed, the flow velocity is sufficiently made smaller than the flow velocity of the molten resin MR flowing through the lower flow route R1, and the molten resin MR does not easily reach the portion of the cavity CA where the connector connecting portion 25 is formed.

The molten resin MR flowing through the upper flow route R3 substantially linearly proceeds through the upper portion of the cavity CA, flowing here through the portion of the cavity CA where the auxiliary ribs 106 and the first reinforcing ribs 24*d* are formed. Then, the molten resin MR flowing through the upper flow route R3 reaches the portion of the cavity CA where the thick portion 102 is formed, with the flow velocity hardly decreased. Next, the molten resin MR flowing through the upper flow route R3 is let flow toward the portion of the cavity CA where the bottom wall portion 24*b* is formed, together with the molten resin MR flowing through the intermediate-portion flow route R2 oriented toward the portion of the cavity CA where the bottom wall portion 24*b* is formed. Here, the flow velocity of the molten resin flowing through the upper flow route R3 is a high flow velocity H (m/s), which is larger than the intermediate flow velocity M (m/s) of the molten resin MR flowing through the intermediate-portion flow route R2 (H>M). This is because a thing which adds a diaphragm to the flow of the molten resin MR (such as the portion where the inner groove portions 104 are formed) is hardly present in a flow direction of the molten resin MR flowing through the upper flow route R3 and the molten resin MR can smoothly flow.

Then, while each molding the caliper fixing portion 23 of the cylindrical main body portion 24*a*, the molten resin MR flowing through the intermediate-portion flow route R2 and the molten resin MR flowing through the upper flow route R3 are merged with each other at the portion where the horizontal portion 24*g* of the cavity CA is formed by the "diaphragm effect" by the outer groove portions 105. Then, the molten resin MR merged at the portion of the cavity CA where the horizontal portion 24*g* of the cavity CA is formed flows into the portion of the cavity CA where the vertical portion 24*f* is formed, and then flows toward the portion of the cavity CA where the connector connecting portion 25 is formed. Her, while the molten resin MR flows through the portion of the cavity CA where the vertical portion 24*f* is formed, portions of the cavity CA where other portions of the cylindrical main body portion 24*a* are formed are also gradually filled with the molten resin MR.

Next, since the flow velocity (≈high flow velocity H (m/s)) of the molten resin MR flowing through the portion of the cavity CA where the vertical portion 24*f* is formed is larger than the flow velocity (=low flow velocity L (m/s)) of the molten resin MR flowing through the lower flow route R1, the molten resin MR flowing through the portion of the cavity CA where the vertical portion 24*f* is formed reaches the portion of the cavity CA where the connector connecting portion 25 is formed, substantially simultaneously with the molten resin MR flowing through the lower flow route R1. With this, a portion to be last filled with the molten resin MR supplied to the inside of the cavity CA (last filled portion) is the portion of the cavity CA where the connector connecting portion 25 is formed. That is, the molten resin MR forms the connector connecting portion 25 last. Thus, [Filling Process] for the case 100 ends.

Here, at the portion of the cavity CA where the horizontal portion 24g is formed, the molten resin MR flowing through the intermediate-portion flow route R2 and the molten resin MR flowing through the upper flow route R3 are merged, and also the molten resins MR diverted to one side and the other side interposing the axial center portion of the cylindrical main body portion 24a are merged together, forming the weld line WL as shown in FIG. 8. Here, in the present invention, unlike the first embodiment described above, after merged at the portion of the cavity CA where the horizontal portion 24g is to be formed, the molten resin MR flows through the portion of the cavity CA where the vertical portion 24f is formed, and then flows toward the portion of the cavity CA where the connector connecting portion 25 is formed. Thus, the weld line WL formed on the vertical portion 24f of the second reinforcing rib 24e becomes a "parallel-flow weld line" as shown in FIG. 15.

Types of the weld line WL formed with the molten resins MR merged include a "counter-flow weld line" and a "parallel-flow weld line". The former "counter-flow weld line" is a weld line formed by the molten resins MR colliding with each other from front to be merged. By contrast, the latter "parallel-flow weld line" is a weld line formed by the merger of molten resins MR and then caused to flow toward the same direction. From the aspect of mechanical characteristics, structural binding of the material (here, PBT resin) of the "parallel-flow weld line" is stronger than that of the "counter-flow weld line", and is advantageous in obtaining high stiffness.

Here, in the present embodiment, the last filled portion of the molten resin MR is the portion of the cavity CA where the connector connecting portion 25 is formed, which is a portion where high stiffness is not required compared with the cylindrical main body portion 24a. Therefore, when the case 100 is viewed as a whole, low stiffness of the connector connecting portion 25 portion compared with the other portions pose no problem.

As has been described in detailed above, according to the second embodiment, operations and effects similar to those of the first embodiment described above can be achieved. In addition, in the second embodiment, the thick portion 102 is provided between the motor accommodating portion 24 and the caliper fixing portion 23, and the thin portions 103 are provided between the motor accommodating portion 24 and the connector connecting portion 25. Therefore, it is possible to quickly supply the molten resin MR to the portion of the cavity CA where the bottom wall portion 24b is formed at the time of injection molding of the case 100. With this, the weld line WL formed on the second reinforcing rib 24e can be made as a "parallel-flow weld line", which has a relatively high stiffness among the types of the weld line WL and, in turn, the stiffness of the motor accommodating portion 24 can be more improved.

Also, according to the second embodiment, the inner groove pars 104 and the outer groove portions 105 are formed inside and outside the motor accommodating portion 24 in the radial direction and in portions near the connector connecting portion 25. Thus, the flow of the molten resin MR at the portions of the cavity CA where the inner groove portions 104 and the outer groove portions 105 are formed can be made less prone to flow at the time of injection molding of the case 100. Thus, the molten resin MR can be more quickly supplied to the portion of the cavity CA where the bottom wall portion 24b is formed at the time of injection molding of the case 100.

Furthermore, according to the second embodiment, the auxiliary ribs 106 extending toward the center axis of the motor accommodating portion 24 are provided between the motor accommodating portion 24 and the caliper fixing portion 23. Thus, the molten resin MR can be quickly supplied to the portion of the cavity CA where the thick portion 102 is formed at the time of injection molding of the case 100. Thus, the molten resin MR can more quickly reach the portion of the cavity CA where the bottom wall portion 24b is formed at the time of injection molding of the case 100.

It goes without saying that the present invention is not restricted to each of the above embodiments and can be variously modified in a range not deviating from the gist of the present invention. In each of the above embodiments, as shown in FIG. 7, one supply passage 71 is arranged on the same side as the caliper fixing portion 23 along the longitudinal direction of the case 21 (100) and on the center line "C" and the molten resin MR is diverted from the supply passage 71. However, the present invention is not restricted to this and, for example, the molten resin MR may be supplied from two supply passages to the inside of the cavity CA simultaneously and at the same pressure. In this case, the supply passages are provided at positions symmetrical in a mirror image across the center line "C". Also, the supply passages may be provided to the lower mold (fixed mold) 60. This eliminates the need to move the dispenser DP.

Furthermore, while the molten resin MR is adopted as a molten material in each of the above embodiments, the present invention is not restricted to this and, for example, a molten aluminum material can also be used depending on the use environment of the actuator 20.

Also, while the brake apparatus 10 is an electrically-operated parking brake apparatus in each of the above-described embodiments, the present invention is not restricted to this, and can be applied also to a by-wire-type brake apparatus (brake by wire) including an actuator operating with brake pedal operation by a driver and connected only via electric wiring.

Furthermore, while the electric motor 30 is a brush-equipped electric motor in each of the above-described embodiments as shown in FIG. 5, the present invention is not restricted to this, and a brushless electric motor can be adopted. In this case, it is possible to inhibit an occurrence of noise from the electric motor and more effectively reduce adverse effects on another vehicle-mounted device.

Also, the present invention is not restricted to the embodiments described above, and can be modified, improved, and so forth as appropriate. In addition, the material, shape, dimensions, number, arrangement location, and so forth of each component in each of the above-described embodiments can be any as long as they can achieve the present invention, and are not restricted to those described above.

The actuator is used as a driving source of a power window apparatus, a sliding door opening/closing apparatus and, furthermore, an electrically-operated brake apparatus and so forth mounted on a vehicle such as automotive vehicle.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An actuator comprising:
a motor having a rotation shaft;
an output shaft which outputs rotation of the rotation shaft;
a speed reduction mechanism provided between the rotation shaft and the output shaft; and
a case in which the motor and the speed reduction mechanism are accommodated,
the case having:
an accommodating portion in which the motor is accommodated;
a support portion provided and arranged side by side with the accommodating portion in a direction crossing an axial direction of the accommodating portion, the support portion supporting the output shaft, and being shorter in length of a radial direction thereof than the accommodating portion;
a convex portion provided to the support portion and located on the opposite side of the support portion from the accommodating portion, the convex portion protruding in a direction crossing the output shaft , the convex portion being formed by an inlet portion for molten material in upper and lower molds;
a weld line provided to the accommodating portion and located on the opposite side of the support portion from the support portion, the weld line being formed by the merger of molten material, and
a reinforcing rib provided to a portion in which the weld line is formed, the reinforcing rib protruding from the accommodating portion to outside.

2. The actuator according to claim 1, wherein
the accommodating portion is in a cylindrical shape having a closed end and an open end, and
the reinforcing rib extends from one end side to the other end side of the accommodating portion.

3. The actuator according to claim 2, wherein
the rotation shaft is rotatably supported by a bearing member,
a bearing accommodating portion in which the bearing member is accommodated is provided on one end side of the accommodating portion, and
the reinforcing rib extends to the bearing accommodating portion.

4. The actuator according to claim 1, wherein
the reinforcing rib protrudes from the accommodating portion, a height of the reinforcing rib from the accommodating portion being gradually increased from one end side toward the other end side of the accommodating portion.

5. The actuator according to claim 1, wherein
a connector connecting portion to which an external connector is connected is provided to the reinforcing rib and located on the opposite side of the reinforcing rib from the accommodating portion, and
a material thickness of the case between the accommodating portion and the support portion is thicker than a material thickness of the case between the accommodating portion and the connector connecting portion.

6. The actuator according to claim 5, wherein
an inner groove portion is provided to the accommodating portion and located on the same side as the connector connecting portion, the inner groove portion extending in the axial direction of the accommodating portion, and making the material thickness of the case thinner.

7. The actuator according to claim 6, wherein
the inner groove portion is a plurality of inner groove portions provided in a circumferential direction of the accommodating portion, and among the inner groove portions, an inner groove portion located on the same side as the support portion is distant from a bottom wall portion of the accommodating portion as compared with other inner groove portions.

8. The actuator according to claim 5, wherein
an outer groove portion extending in the axial direction of the accommodating portion and making the material thickness of the case thinner is formed outside the accommodating portion in a radial direction and on the same side as the connector connecting portion along the circumferential direction of the accommodating portion.

9. The actuator according to claim 8, wherein
the outer groove portion extends to a bottom wall portion of a cylindrical main body portion forming part of the accommodating portion.

10. The actuator according to claim 5, wherein
a reinforcing rib extending toward a center axis of the accommodating portion is provided between the accommodating portion and the support portion.

11. The actuator according to claim 1, wherein
the output shaft causes a piston of a disc brake to perform reciprocating motions.

12. A method of manufacturing an actuator including:
a motor having a rotation shaft;
an output shaft which outputs rotation of the rotation shaft;
a speed reduction mechanism provided between the rotation shaft and the output shaft; and
a case in which the motor and the speed reduction mechanism are accommodated,
the case having:
an accommodating portion in which the motor is accommodated;
a support portion provided and arranged side by side with the accommodating portion in a direction crossing an axial direction of the accommodating portion, the support portion supporting the output shaft,
a convex portion provided to the support portion and located on the opposite side of the support portion from the accommodating portion, the convex portion protruding in a direction crossing the output shaft;
a weld line provided to the accommodating portion and located on the opposite side of the support portion from the support portion, the weld line being formed by the merger of molten material; and
a reinforcing rib provided to a portion in which the weld line is formed, the reinforcing rib protruding from the accommodating portion to outside,
the method comprising:
a mold preparing step of causing upper and lower molds forming the case to face each other so as to form a cavity for forming the case;
a filling step of actuating a dispenser to supply molten material to a supply passage provided to at least one of the upper and lower mold, and filling the cavity with molten material to form the convex portion on the same side as the supply passage of the cavity, and to form the weld line on the opposite side of the cavity from the supply passage;
a cooling step of stopping the dispenser and cooling the upper and lower molds to cure the molten material in the cavity; and a removing step of separating the upper and lower molds from each other to remove the case from the upper and lower molds after curing from the upper and lower molds.

13. The method of manufacturing the actuator, according to claim 12, wherein
in the filling step, the molten material is caused to collide with a step portion provided to at least one of the upper and lower molds from the supply passage to bend a traveling direction of the molten material, and the cavity is then filled with the molten material.

\* \* \* \* \*